United States Patent [19]

Harris et al.

[11] Patent Number: 5,089,568

[45] Date of Patent: Feb. 18, 1992

[54] PROCESS OF MAKING THERMOPLASTIC COPOLYMERS CONTAINING POLYBENZOXAZOLE, POLYBENZOTHIAZOLE AND POLYBENZIMIDAZOLE MOIETIES

[75] Inventors: William J. Harris; Wen-Fang Hwang, both of Midland, Mich.

[73] Assignee: The Dow Chemical Company, Midland, Mich.

[21] Appl. No.: 256,338

[22] Filed: Oct. 11, 1988

[51] Int. Cl.$^5$ .................. C08G 75/32; C08G 73/22; C08G 73/18

[52] U.S. Cl. .................. 525/410; 525/411; 525/413; 525/415; 525/424; 524/425; 524/434

[58] Field of Search .............. 525/410, 411, 413, 415, 525/424, 425, 434; 528/183, 184, 185, 420, 432; 524/417

[56] References Cited

U.S. PATENT DOCUMENTS

| | | | |
|---|---|---|---|
| 3,883,610 | 5/1975 | Odier | 525/434 |
| 3,951,920 | 4/1976 | Senoo et al. | 528/184 |
| 4,108,835 | 8/1978 | Arnold et al. | 528/183 |
| 4,207,407 | 1/1980 | Helminiak et al. | 525/432 |
| 4,229,566 | 10/1980 | Evers et al. | 528/185 |
| 4,359,567 | 11/1982 | Evers | 528/184 |
| 4,377,546 | 3/1983 | Helminiak et al. | 528/183 |
| 4,414,383 | 11/1983 | Conciatori et al. | 528/183 |
| 4,463,167 | 7/1984 | Choe et al. | 528/184 |
| 4,533,692 | 8/1985 | Wolfe et al. | 524/417 |
| 4,533,693 | 8/1985 | Wolfe | 524/417 |
| 4,533,724 | 8/1985 | Wolfe et al. | 524/417 |
| 4,544,713 | 10/1985 | Tsai et al. | 528/321 |
| 4,578,432 | 3/1986 | Tsai et al. | 528/183 |
| 4,703,103 | 10/1987 | Wolfe et al. | 528/179 |
| 4,749,753 | 6/1988 | Nishihara et al. | 528/417 |
| 4,772,678 | 9/1988 | Sybert et al. | 528/417 |

OTHER PUBLICATIONS

Gordon et al., "Synthesis and Characterization of Segmented Block Copolybenzimidazoles Containing Rigid Rod and Flexible Coil Segments", 28(2) *Polymer Preprints* 308(1987).
Gordon et al., "Thermally Stable Block Copolymers", *Polymer Preprints* 146(1985).
Tsai et al., "High Strength Modulus ABA Block Copolymers", 26(1)*Polymer Preprints* 144 (1985).
Krause et al., "Morphology and Mechanical Properties of a Phase Separated and Molecular Composite 30% PBT/70% ABPBI triblock copolymer", 29 *Polymer* 195(1988).
Gordon et al., "Thermally Stable Block Copolymers", 27(1) *Polymer Preprints* 311(1986).
Tsai et al., "High Strength/High Modulus Aromatic Heterocyclic ABA Block Copolymers", Report AFWAL-TR-87-4072 (May 1987).
Evers, "Graft Copolymers of Rod-like Poly(p--phenylenebenzobisimidazole)", 29(1)*Polymer Preprints* 244(1988).
Evers et al., "Articulated All-Para Polymers with 2,6-Benzobisoxazole, 2,6-Benzobisthiazole, and 2,6-Benzobisimidazole Units in the Backbone", 14*Macromolecules* 925 (1981).
Hwang et al., "Phase Relationships of Rigid Rod Polymer/Flexible Coil Polymer/Solvent Ternary Systems", 23 Polymer Eng. & Sci. 789(1983).
Hwang et al., "Solution Processing and Properties of Molecular Composite Fibers and Films", 23 *Polymer Eng. & Sci.* 784(1983).
Hwang et al., "Composites on a Molecular Level: Phase Relationships, Processing and Properties", B22 *J. Macromol. Sci.-Phys.* 231 (1983).
Bianchi et al., "Nematogenic Block Copolymers of Rigid and Flexible Aromatic Units. III", 20 *Polymer J.* 83(1988).
Krigbaum et al., "Nematogenic Block Copolymers of Rigid and Flexible Aromatic Units. III", 25*J. Poly Sci.* 653 (1987).
Moore et al., "Molecular Composites via In Situ Polymerization: Poly(Phenylene Tehephthalimide)-Nylon 3", 32*J. Applied Polymer Sci.* 6299(1986).
Takayanagi et al., "Polymer Composites of Rigid and Flexible Molecules: System of Wholly Aromatic and Aliphatic Polyamides", B17(4) *J. Macromol. Sci.-Phys.* 591(1980).
Takayanagi, "Polymer Composites of Rigid and Flexible Molecules", 55 *Pure & Applied Chem.* 819(1983).
Ueda et al., "Synthesis of Polyketones by Direct Polycondensation of Dicarboxylic Acids with Diaryl Compounds using Phosphorus Pentoxide/Methanesulfonic Acid as Condensing Agent and Solvent", 5 Makromol. Chem., Rapid Commun. 833-6 (1985).
Ueda, "Synthesis of Poly(phenylene ether sulfone)by direct self-polycondensation of Sodium 4-Phenoxybenzenesulfonate Using Phosphorus Pentoxide/Methanesulfonic Acid as Condensing Agent and Solvent", 6 Makromol. Chem., Rapid Commun. 271-74 (1985).

*Primary Examiner*—John S. Maples

[57] ABSTRACT

Block copolymers can be formed from heterocyclic polymers such as PBO and thermoplastic polymers such as polyamide or poly(aromatic ether ketone). The block copolymer compositions are thermoplastic and do not experience substantial phase separation, even at about their glass transition temperature. The block copolymer compositions can be formed into fibers, films and laminate or compression-molded articles. PBO, PBI and PBT polymers terminated by active aromatic rings or acylating groups are particularly useful for making the block copolymers.

37 Claims, No Drawings

PROCESS OF MAKING THERMOPLASTIC COPOLYMERS CONTAINING POLYBENZOXAZOLE, POLYBENZOTHIAZOLE AND POLYBENZIMIDAZOLE MOIETIES

STATEMENT OF GOVERNMENT INTEREST

This invention was made with Government support under contracts F49620-86-C-0057 and/or F33615-86-C-5068 awarded by the Department of the Air Force. The Government has certain rights in this invention.

BACKGROUND OF THE INVENTION

The present invention relates to the art of PBZ polymers (also known as PBX polymers, see definition hereinafter) and polymer compositions containing blocks of those polymers.

PBZ polymers, i.e. polybenzoxazole, polybenzothiazole and polybenzimidazole, and their synthesis are described in great detail in the following patents which are incorporated by reference: Wolfe et al., *Liquid Crystalline Polymer Compositions and Process and Products,* U.S. Pat. No. 4,703,103 (Oct. 27, 1987); Wolfe et al., *Liquid Crystalline Polymer Compositions and Process and Products,* U.S. Pat. No. 4,533,692 (Aug. 6, 1985); Wolfe et al., *Liquid Crystalline Poly(2,6-Benzothiazole) Compositions, Process and Products,* U.S. Pat. No. 4,533,724 (Aug. 6, 1985); Wolfe, *Liquid Crystalline Polymer Compositions, Process and Products,* U.S. Pat. No. 4,533,693 (Aug. 6, 1985) (hereinafter the Wolfe '693 patent) and Tsai et al., *Method for Making Heterocyclic Block Copolymer,* U.S. Pat. No. 4,578,432 (Mar. 25, 1986).

PBZ polymers are noted for their high strength, for their high thermal stability and for their low processability. To process PBZ polymers, the polymers are ordinarily dissolved in a mineral acid to form liquid crystal compositions which are then spun to form fibers or processed to form films.

To improve processability, rigid rod PBZ polymers can be incorporated into a molecular composites with flexible polymers. Hwang et al., "Solution Processing and Properties of Molecular Composite Fibers and Films," 23 *Polymer Eng. & Sci.* 784 (1983); Hwang et al., "Phase Relationships of Rigid Rod Polymer/Flexible Coil Polymer/Sovent Ternary Systems," 23 *Polymer Eng. & Sci.* 789 (1983); and Hwang et al., "Composites on a Molecular Level: Phase Relationships, Processing and Properties," B22 *J. Macromol. Sci.-Phys.* 231 (1983), which are incorporated herein by reference.

Due to the poor miscibility of PBZ polymers with thermoplastic or flexible polymers, such composites often experience phase separation and a resulting loss of strength, clarity or other desirable properties, particularly if heated above the glass transition temperature of the thermoplastic polymer. To improve the miscibility of PBZ polymers, they have been formed in block copolymers with AB-PBO, -PBT or -PBI polymers, a non-thermoplastic flexible coil variant of the PBZ polymer. Tsai, *Method for Making Heterocyclic Block Copolymer,* U.S. Pat. No. 4,544,713 (Oct. 1, 1985); Gordon et al., "Synthesis and Characterization of Segmented Block Copolybenzimidazoles Containing Rigid Rod and Flexible Coil Segments," 28(2) *Polymer Preprints* 308 (1987); Gordon et al., "Thermally Stable Block Copolymers," 26(1) *Polymer Preprints* 146 (1985); Tsai et al., "High Strength Modulus ABA Block Copolymers," 26(1) *Polymer Preprints* 144 (1985); Krause et al., "Morphology and Mechanical Properties of a Phase Separated and a Molecular Composite 30% PBT/70% ABPBI triblock copolymer", 29 *Polymer* 195 (1988); and Gordon et al., "Thermally Stable Block Copolymers," 27(1) *Polymer Preprints* 311 (1986). It is also reported that graft copolymers of PBI and polypropylene oxide have been synthesized. Evers, "Graft Copolymers of Rod-like Poly(p-phenylenebenzobisimidazole)," 29(1) *Polymer Preprints* 244 (1988).

What is needed are new block copolymers containing PBZ moieties and particularly those which form compositions which are thermoplastic and do not experience substantial phase separation even after being heated and shaped at their glass transition temperature.

SUMMARY OF THE INVENTION

A first aspect of the present invention is a PBZ polymer terminated by an active acylation reactive group, which polymer comprises:
(1) a rigid rod PBZ block;
(2) a decoupling group linked to the rigid rod PBZ block; and
(3) an acylation reactive group linked to said decoupling group.

A second aspect of the present invention is a process of making a rigid rod PBZ polymer terminated by an acylation reactive group, said process comprising the step of contacting a rigid rod PBZ polymer terminated by an azole-forming moiety with an terminating monomer having
(1) an azole-forming moiety capable of reacting with the azole-forming moiety on the PBZ polymer;
(2) a decoupling group linked to said azole-forming moiety; and
(3) an acylation reactive group bonded to said decoupling group,
in a mineral acid under conditions such that a PBZ polymer terminated by an acylation reactive group is produced.

A third aspect of the present invention is a process for forming a block copolymer comprising the step of contacting a PBZ polymer terminated by an active end group, in mineral acid capable of dissolving it, with either
(1) a thermoplastic polymer containing a polyamide, polyimide, polyquinoxaline, polyquinoline, poly(aromatic ketone), poly(aromatic sulfone) or poly(aromatic ether) or a copolymer of one of those polymers, which thermoplastic polymer is soluble in the mineral acid and can react to form a link with the active end group of the PBZ polymer or
(2) at least one monomer which can react in the mineral acid to form a link with the PBZ polymer and to form a thermoplastic polymer containing poly(aromatic ketone), poly(aromatic sulfone) or poly(aromatic ether) or a copolymer of one of those polymers,
under conditions such that a copolymer having a PBZ polymer block and thermoplastic polymer block is formed.

A fourth aspect of the present invention is a block copolymer comprising:
(1) a PBZ block having at least ten PBZ polymer units; and
(2) a thermoplastic block linked to said PBZ block containing a polyamide, polyimide, polyquinoxaline, polyquinoline, poly(aromatic ketone), poly(aromatic sulfone) or poly(aromatic ether) or a copolymer of one of those polymers.

A fifth aspect of the present invention is a thermoplastic composition comprising PBZ polymer moieties linked to thermoplastic polymer moieties containing a polyamide, polyimide, polyquinoxaline, polyquinoline, poly(aromatic ketone), poly(aromatic sulfone) or poly(aromatic ether) or a copolymer of one of those polymers, which composition has a glass transition temperature of no more than about 400° C., can be coagulated without substantial phase separation, and can be heated to its glass transition temperature without substantial phase separation.

The process described in the second aspect of the present invention can be used to synthesize PBZ polymers which form the first aspect of the present invention. PBZ polymers which form the first aspect of the present invention can be formed into useful fibers and films as described in U.S. Pat. No. 4,533,693 at col. 82-85; but are more useful as reagents in the process which forms the third aspect of the present invention.

The process which forms the third aspect of the present invention is useful for making block copolymers which are the fourth aspect of the present invention and polymer compositions which are the fifth aspect of the present invention. Those block copolymers and polymer compositions can also be formed into useful fibers and films as described in U.S. Pat. No. 4,533,693 at col. 82-85 and in Hwang et al., "Solution Processing and Properties of Molecular Composite Fibers and Films," 23 *Polymer Eng. & Sci.* 784, 785 (1983), which are previously incorporated by reference.

Fibers and films have high tensile strength and modulus and can be used to form articles as described in U.S. Pat. No. 4,533,693 at col. 82-85. Furthermore, within preferred embodiments, fibers and films are thermoplastic and can be heated above their glass transition temperature without experiencing substantial phase separation. Therefore, the fibers and films can be compression molded at above their glass transition temperature to may useful articles of high strength, such as compression molded laminates.

DETAILED DESCRIPTION OF THE INVENTION

Definitions

The following terms, which are used repeatedly throughout this application, have the meanings and preferred embodiments set out hereinafter unless otherwise specified.

Acid group (AG)—a carboxylic acid, a sulfonic acid or a derivative of such an acid, such as a halide or ester, which can react in mineral acid with an aromatic group to form an aromatic ketone or sulfone moiety. Acid groups are preferably the acid or acid halide and more preferably a carboxylic acid or carboxylic acid chloride.

Acylation reactive group (AC)—either
(1) an acid group as previously defined or
(2) an aromatic group,
which is capable of reacting with another acylation reactive group in the presence of an acylation catalyst such as aluminum chloride or a mineral acid to form an aromatic ketone or sulfone.

Aromatic group (Ar)—any aromatic ring or ring system. Size is not critical as long as the aromatic group is not so big that it prevents further reactions of the moiety in which it is incorporated. Aromatic groups preferably comprise no more than about 19 carbons, more preferably no more than about 12 carbons and most preferably no more than about 6 carbons. They may be heterocyclic but are preferably carbocyclic and more preferably hydrocarbyl. They may comprise a single aromatic ring, a fused ring system or an unfused ring system wherein two or more rings are joined by bonds between the rings or by moieties which are inert in mineral acid. Aromatic groups preferably comprise a single ring. While aromatic groups may contain substituents which are stable in mineral acid, such as halogens, phenyl sulfone moieties, alkoxy moieties, aryloxy moieties or alkyl groups, they preferably have no substituents other than those specified hereinafter.

Azole ring—an oxazole, thiazole or imidazole ring. The carbon atom bonded to both the nitrogen atom and the oxygen, sulfur or second nitrogen atom is the 2-carbon, as depicted in Formula 1

wherein Z is —O—, —S— or —NR—; and R is hydrogen, an aromatic or an aliphatic group, preferably hydrogen or an alkyl group, and most preferably hydrogen. R preferably comprises no more than about 6 carbon atoms, more preferably no more than about 4 and most preferably no more than about 1. Each azole ring is independently preferably oxazole or thiazole and more preferably oxazole.

Azole-forming moiety—an "o-amino-basic moiety" or "electron-deficient carbon group," as those terms are hereinafter defined.

o-Amino-basic moiety—a moiety, which is bonded to an aromatic group, consisting of
(1) a primary amine group bonded to the aromatic group and
(2) a hydroxy, thiol or primary or secondary amine group bonded to the aromatic group ortho to said primary amine group.

It preferably comprises a hydroxy, thiol or primary amine moiety, more preferably comprises a hydroxy or thiol moiety, and most preferably comprises a hydroxy moiety. Secondary amine groups comprise an aromatic or an aliphatic group and preferably an alkyl group. The secondary amine group preferably comprises no more than about 6 carbon atoms, more preferably no more than about 4 carbon atoms and most preferably no more than about 1 carbon atom.

Decoupling group (D)—a divalent organic moiety which links an acylation reaction group to a deactivating group, such as an azole ring, a carbonyl group or a sulfonyl group, and which, due to its composition, structure or both, shields the acylation reactive group from the deactivating influence of the deactivating group sufficiently for the acylation reactive group to react with another acylation reactive group in mineral acid. Decoupling groups may comprise, for example, an ether group, a thio group, an aliphatic group or a plurality of aromatic groups. Decoupling groups preferably comprise an ether group, a thio group or a plurality of aromatic groups; and more preferably comprise an ether group. Examples of decoupling groups include

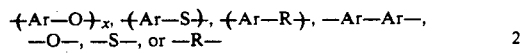

wherein Ar is an aromatic group as previously defined, R is an alkyl group and x is a number of repeating units between 1 and 10. Preferably, x is 1 or 2.

The minimum level of decoupling needed for a decoupling group is dependent upon the acylation reactive group bonded to the decoupling group and the reaction medium. Acid groups are ordinarily less susceptible to deactivation than aromatic groups. When the acylation reactive group is an acid group, the decoupling group need only comprise two unfused aromatic groups. Aromatic groups, on the other hand, are relatively more susceptible to deactivation. When the acylation reactive group is an aromatic group, the decoupling group preferably comprises an ether group, a thio group or an alkyl group; and more preferably comprises a first ether or thio group linking two aromatic groups and a second ether or thio group linking the decoupling group to the acylation reactive group.

Electron-deficient carbon group (Q)—any group containing a carbon atom which can react in the mineral acid with an o-amino-basic moiety to form an azole ring. such as the groups listed in Column 24, lines 59–66 of the U.S. Pat. No. 4,533,693, which is incorporated herein by reference. Preferred electron-deficient carbon groups are carboxylic acids, acid halides, metal carboxylate salts, cyano groups and trihalomethyl groups. Halogens in electron-deficient carbon groups are preferably chlorine, bromine or iodine and more preferably chlorine.

Mineral acid—any liquid acid capable of dissolving PBZ polymers, such as sulfuric acid, methanesulfonic acid, trifluoromethylsulfonic acid, polyphosphoric acid and mixtures thereof. Mineral acids are preferably polyphosphoric acid or a mixture of methanesulfonic acid and phosphorus pentoxide. Polyphosphoric acid preferably has a $P_2O_5$ content by weight of at least about 70 percent, more preferably at least about 75 percent and preferably has a $P_2O_5$ content of at most about 90 percent, more preferably at most about 85 percent. Mixtures of methanesulfonic acid and phosphorus pentoxide are preferably at least about 20:1 by weight and at most about 5:1 by weight.

PBZ polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each unit contains an oxazole ring bonded to an aromatic group, which need not necessarily be a benzene ring. The term "polybenzoxazole (PBO)" also refers broadly to poly(phenylene-benzo-bis-oxazole)s and other polymers wherein each unit comprises a plurality of oxazole rings fused to an aromatic group. The same understandings shall apply to the terms polybenzothiazole (PBT) and polybenzimidazole (PBI).

Rigid Rod PBZ polymer—An "intrinsic" or "articulated" rigid rod PBZ polymer as the terms "intrinsic" and "articulated" are defined in the Hwang, "Processing, Structure and Properties of Liquid Crystalline PBT Polymer", Kansai Committee of the Society of Fiber Science and Technology, Japan, Post Symposium on Formation, Structure and Properties of High Modulus and High Tenacity Fibers 23–26 (Aug. 26, 1985); Evers et al, "Articulated All-Para Polymers with 2,6-Benzobisoxazole, 2,6-Benzobisthiazole, and 2,6-Benzobisimidazole Units in the Backbone," 14 Macromolecules 925 (1981); Evers, "Thermoxadatively Stable Articulated Benzobisoxazole and Benzobisthiazole Polymers," 24 J. Poly. Sci. Part A 1863 (1986) and Evers et al., *Articulated Para-Ordered Aromatic Heterocyclic Polymers Containing Diphenoxybenzene Structures*, U.S. Pat. No. 4,229,566 (Oct. 21, 1980).

Intrinsic rigid rod polymers are essentially rectilinear and have a persistence length comparable to their contour length. Articulated rigid rod polymers comprise a plurality of essentially rectilinear moieties joined by a relatively small number of non-linear moieties. Rigid rod PBZ polymers used in the present invention are preferably intrinsic rigid rod polymers. If articulated, they preferably comprise on average no more than about 1 non-linear mer unit for each 9 essentially rectilinear mer units.

PBZ Polymers Useful in the Practice of the Present Invention

The present invention uses PBZ polymers terminated by reactive moieties which can form a linkage with a thermoplastic polymer. The reactive moieties are preferably azole-forming moieties or acylation reactive sites. The PBZ polymers are preferably rigid rod PBZ polymers, as previously defined and as further described hereinafter. The basic properties and synthesis of PBZ polymers are discussed in detail in the Wolfe and Tsai patents previously incorporated by reference. Any PBZ polymer defined therein can be used in the practice of the present invention.

To synthesize PBZ polymers, a first monomer having two azole-forming moieties, at least one of which is an o-amino-basic moiety, is contacted with a second monomer having two azole-forming moieties, at least one of which is an electron-deficient carbon group, in mineral acid under conditions such that the first and second monomer react to form a PBZ polymer. The polymer may be synthesized by self-polymerization, in which the first and second monomers each comprise an o-amino-basic moiety and an electron-deficient carbon group. The polymer is preferably synthesized by copolymerization, in which case the first monomer comprises two o-amino-basic moieties and the second monomer comprises two electron-deficient carbon groups.

Self-polymerizing monomers comprise:
(1) an aromatic group (Ar) as that term has previously been defined;
(2) an o-amino-basic moiety on said aromatic group; and
(3) an electron-deficient carbon group linked to said aromatic group.

The electron-deficient carbon group is preferably para to either the amine group or the Z moiety of the o-amino-basic moiety.

Self-polymerizing monomers are preferably represented by Formula 3:

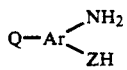   3 and are more preferably represented by either Formula 4(a) or 4(b):

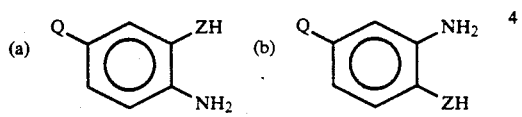   4 wherein:

Ar is an aromatic moiety as previously described;

each Z is ortho to one primary amine group and conforms to the descriptions previously given for Z moieties; and Q is an electron-deficient carbon group conforming to the descriptions and preferred embodiments set out previously.

Self-polymerizing monomers are most preferably 3-hydroxy-4-aminobenzoic acid or 3-amino-4-hydroxybenzoic acid. Other suitable examples are listed in U.S. Pat. No. 4,533,693 in columns 33-35 at Table 8.

In a copolymerization of two different monomers, the first copolymerizing monomer comprises:
(1) a first aromatic group ($Ar^1$) as aromatic groups are previously defined; and
(2) two o-amino-basic moieties bonded to said first aromatic group.

First copolymerizing monomers preferably comply with Formula 5:

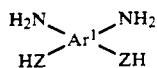   5 wherein:

$Ar^1$ is the first aromatic moiety as previously described; and each Z is ortho to one primary amine group and conforms to the descriptions previously given for Z moieties.

(For the purpose of this application, when the amine groups and Z moieties of a monomer are depicted as bonded to an aromatic group without indicating their position, as in Formulae 4(a) and 4(b), it shall be understood that:
(1) each amine group is ortho to one Z moiety; and
(2) if the monomer has two o-amino-basic moieties, one primary amine group and Z moiety may be in either cis position or trans position with respect to the other amine group and Z moiety, for example as illustrated in Formulae 6(a) and (b).

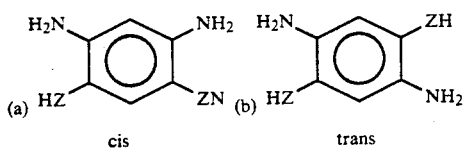   6

The same understandings apply with respect to nitrogen atoms and Z moieties in an azole ring depicted as fused to an aromatic moiety.)

The second copolymerizing monomer comprises:
(1) a first and a second electron-deficient carbon group as that term is previously defined; and
(2) a divalent linking group (DL) which links said first and second electron-deficient carbon group, said divalent linking group being an organic moiety inert with respect to all reagents in mineral acid under reactive conditions.

The second copolymerizing monomer preferably complies with Formula 7

   7 wherein Q is an electron-deficient carbon group as previously defined, and DL is a divalent linking group as previously defined. The divalent linking group (DL) is preferably a second aromatic group ($Ar^2$) conforming to the description and preferred embodiments of aromatic groups set out previously.

Preferably, the first copolymerizing monomer is a "linear" first monomer and the second copolymerizing monomer is a "linear" second monomer.

Linear first monomers comply with the following additional limitations:
(1) the first aromatic moiety is a single ring or a fused ring system, and more preferably a single ring; and
(2) each group in the first o-amino-basic moiety is para with respect to a group in the second o-amino-basic moiety, i.e., groups in the first o-amino-basic moiety are in 1 and 2 position and groups in the second o-amino-basic moiety are in 4 and 5 position on a single ring; groups in the first o-amino-basic moiety are in 2 and 3 position and groups in the second o-amino-basic moiety are in 6 and 7 position on a system of two fused rings; and so on.

For example, the linear first monomer may comply with Formula 5 wherein $Ar^1$ is chosen from the moieties depicted in Formulae 8(a)-(g):

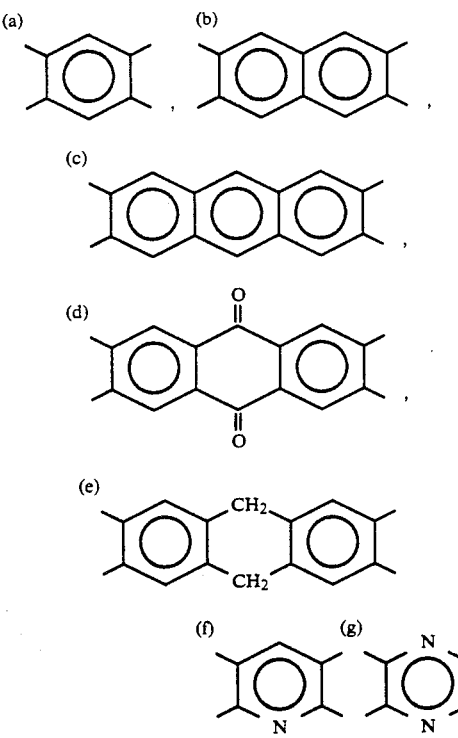

or substitute-bearing variations and heterocyclic variations thereof. $Ar^1$ is preferably a six-membered ring as depicted in Formulae 8(a), (f) or (g). Linear first monomers more preferably comply with either Formula 9(a) or (b). The most preferred linear first monomers are 4,6-diaminoresorcinol and 2,5-diaminohydroquinone.

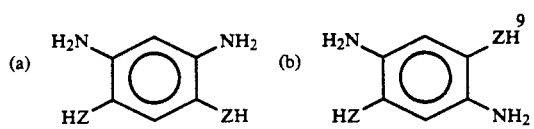

Linear second monomers conform to the following guidelines:

(1) the divalent linking group (DL) is a second aromatic group; and
(2) the first and second electron-deficient carbon groups are bonded to the second aromatic group in para position with respect to each other.

For example, linear second monomers may comply with Formula 7, wherein DL is a bond or a second aromatic group depicted in Formulae 10(a)-(c)

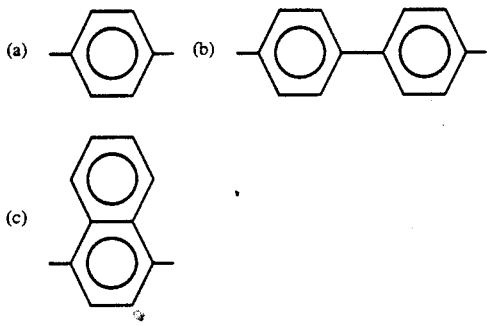

or a substitute-bearing variation or heterocyclic variation thereof. The linking moiety (DL) is preferably a six-membered ring or an unfused pair of six-membered rings linked by a single bond which is para to the electron-deficient carbon groups. It is more preferably either a 1,4-phenylene or a 4,4'-biphenylene group and most preferably a 1,4-phenylene group. Linear second monomers are most preferably terephthalic acid or terephthaloyl chloride.

Examples of linear first monomers and references to their synthesis are found in U.S. Pat. No. 4,533,693 Table 1, Columns 19-21. Examples of non-linear first monomers and references to their synthesis are found in U.S. Pat. No. 4,533,693 Tables 2 and 3, columns 21-22 and 23-24. Examples of linear second monomers and references to their synthesis are found in U.S. Pat. No. 4,533,693 Table 4 (all shown except 2e-2h) and Table 5(2 aa and bb), Columns 25-29. Examples of non-linear second monomers and references to their synthesis are found in U.S. Pat. No. 4,533,693 Table 4(2e-2h) and Tables 5 (except for 2 aa and bb) and 6 Columns 26 and 29-32. All of the above are incorporated by reference.

Reaction conditions are similar for both self-polymerizing and copolymerizing monomers and are discussed at length in U.S. Pat. Nos. 4,703,103; 4,533,724; 4,533,692; 4,533,693 and 4,578,432 (Mar. 25, 1986) which are previously incorporated by reference. The reaction takes place in a mineral acid capable of dissolving the resulting polymer or oligomer. The mineral acid is preferably polyphosphoric acid. The $P_2O_5$ content of the polyphosphoric acid is preferably at least about 76 percent at the commencement of the reaction and $P_2O_5$ is preferably added during the reaction to increase that content. The $P_2O_5$ content is preferably controlled as discussed in U.S. Pat. No. 4,533,693 from column 42, line 61 to column 45, line 62, which is incorporated herein by reference.

The reaction is performed under an inert atmosphere, for instance under nitrogen, argon or helium. The pressure of the reaction is not critical as long as the solvent acid remains in liquid form. The reaction may be continued for any length of time necessary to bring about the desired conversion of monomer to polymer.

Although the reaction can occur at low temperatures, it occurs only very slowly at temperatures below about 50° C. On the other hand, some monomers such as terephthaloyl chloride can sublime readily at higher temperatures. The temperature is preferably relatively low at commencement of the reaction, such as between about 50° C. and about 70° C., and the temperature is preferably raised throughout the course of the reaction. The maximum temperature achieved during the reaction is preferably at least about 70° C., more preferably at least about 95° C., more highly preferably at least about 150° C. and most preferably at least about 190° C. The maximum temperature of the reaction may go up to any point at which the polymer and solvent are stable. The maximum temperature is preferably no more than about 240° C., more preferably no more than about 225° C. and most preferably no more than about 210° C.

The time for the reaction varies widely depending upon the reagents and temperatures used, in a manner familiar to persons skilled in the art. The reaction preferably proceeds at between about 190° C. and 210° C. for at least about 1 hour.

The monomers used are preferably all copolymerizing monomers as previously described. Excesses of one copolymerizing monomer will shorten the polymer chain in a manner familiar to persons skilled in the art. Preferably, neither the first nor the second monomer is in more than about a 10 percent molar excess; more preferably, neither monomer is in more than about a 5 percent molar excess; most preferably neither monomer is in more than about a 1 percent molar excess. Preferably, a slight excess of the first monomer is used; more preferably an excess of at least about 1 mole percent is used. Among the copolymerizing monomers, at least about 70 percent are preferably linear monomers, more preferably at least about 90 percent, more highly preferably at least about 97 percent and most preferably about 100 percent.

The concentration of monomer in solvent is not critical as long as the solvent can dissolve the resulting polymer or oligomer. The concentration of monomer in solvent is preferably at least about 2.5 weight percent, more preferably at least about 10 weight percent and most preferably at least about 14 weight percent. The maximum concentration is limited only by solubility. Many monomers, such as terephthalic acid and 4,4'-bis(-benzoic acid) are only poorly soluble in mineral acids, so that vigorous stirring is required throughout the reaction.

Linear and non-linear first and second copolymerizing monomers and self-polymerizing monomers react to form PBZ units as exemplified in Equations 11(a)-(e).

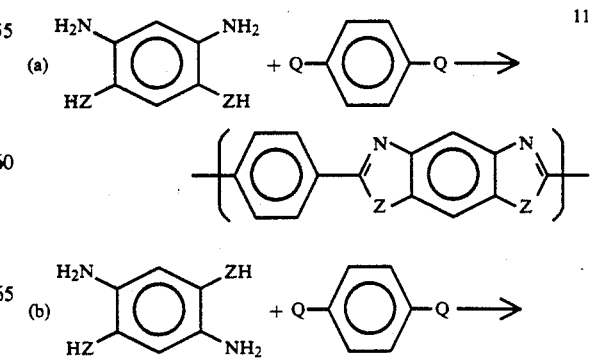

-continued

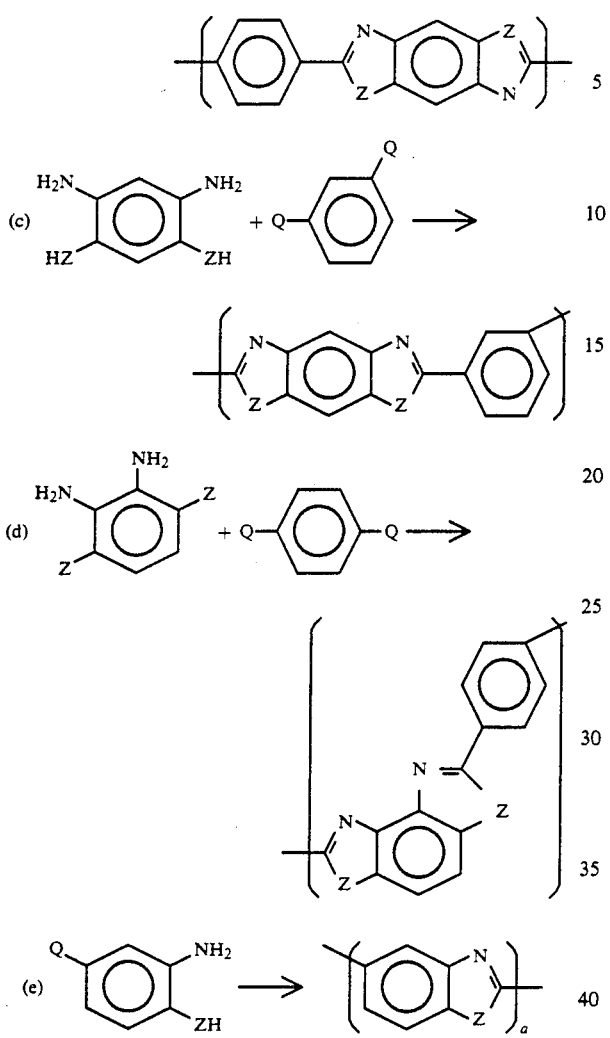

The PBZ polymers used in the present invention comprise a plurality of PBZ units. Each PBZ unit comprises:
(1) a first aromatic group; and
(2) a first azole ring which is fused with the first aromatic group.

PBZ units preferably further comprise
(3) a second azole ring which is fused with the first aromatic group, and
(4) a divalent linking group bonded by a single bond to the 2-carbon of the second azole ring.

First aromatic groups have the preferred embodiments of first aromatic groups in first copolymerizing monomers (Ar¹). Divalent linking groups have the description and preferred embodiments of divalent linking groups in second copolymerizing monomers (DL).

If the PBZ unit has only a single azole ring (hereinafter referred to as AB-PBZ), then PBZ units are preferably linked by a single bond from the 2-carbon of the azole ring to the first aromatic group of an adjacent unit. If the PBZ unit has two azole rings and a divalent linking group, then units are preferably linked by a single bond from the divalent linking group to the 2-carbon in the first azole group of an adjacent unit (hereinafter referred to as ABA-PBZ).

PBZ units preferably comply with one of the following two formulae

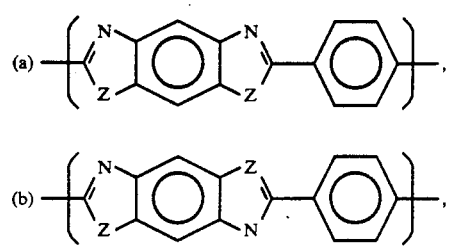

wherein Ar¹, DL and Z have the meanings previously assigned in describing the monomers. DL is preferably a second aromatic group (Ar²) as previously described.

Blocks of PBZ units in PBZ polymers used in the present invention comprise at least about 10 repeating PBZ units, preferably at least about 20 PBZ units, more preferably at least about 50 PBZ units and most preferably at least about 100 PBZ units. The inherent viscosity of the polymer in methanesulfonic acid at 25° C. is preferably at least about 3 dL/g, more preferably at least about 5 dL/g and most preferably at least about 9 dL/g. Although PBZ polymers used in the present invention may be "flexible coil" PBZ polymers, the PBZ polymer is highly preferably a rigid rod PBZ polymer wherein "linear PBZ units" make up at least about 90 percent of the PBZ units; more preferably at least about 97 percent and most preferably about 100 percent. In articulated rigid rod PBZ polymers, the non-linear PBZ units may be AB-PBZ units or non-linear ABA-PBZ units.

Linear PBZ units are ABA-PBZ units, wherein the first aromatic group is a first aromatic group as described for linear copolymerizing monomers and the divalent linking group is a second aromatic group as described in describing linear copolymerizing monomers. Linear PBZ units preferably comply with Formula 12 shown previously wherein:
(1) Ar¹ conforms to one of Formulae 8(a)–(g) or a substituted variation thereof; and
(2) DL is a bond or a second aromatic moiety (Ar²) which conforms to one of Formulae 10(a)–(c) or a substituted or heterocyclic variation thereof.

The first aromatic group (Ar¹) is preferably a tetravalent six-membered ring (Formulae 8(a), (f) or (g)) and more preferably a tetravalent benzene ring (Formula 8(a)). The divalent organic moiety is preferably a second aromatic group (Ar²), is more preferably 1,4-phenylene or 4,4'-biphenylene (Formulae 10(a) or (b)) and is most preferably 1,4-phenylene (Formula 10(a)).

Linear PBZ units most preferably conform with one of Formulae 14(a)–(d).

(c) 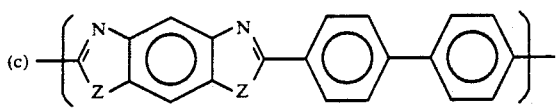

and (d) 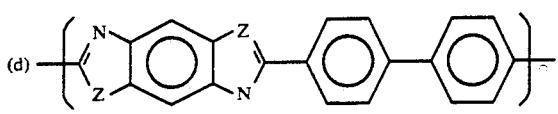

Examples of non-linear PBZ units include those depicted in Formula 15(a)–(g) below, and substituted or heterocyclic variations thereof, and isomers of Formulae 15 (a) and (b) wherein positions of the nitrogen atom and Z moiety are reversed or isomers of 15 (c)–(g) wherein the nitrogen atoms and Z moieties are in trans position.

15

(a) 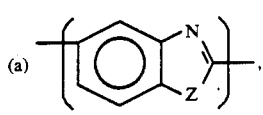

(b) 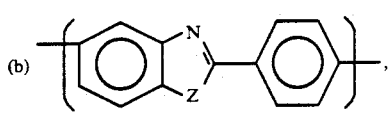

(c) 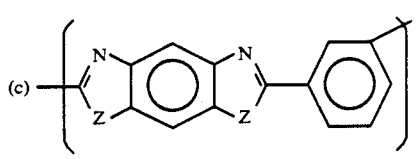

(d) 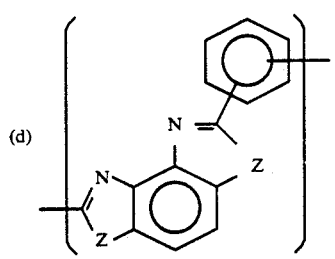

(e) 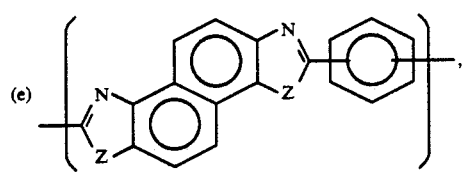

(f) 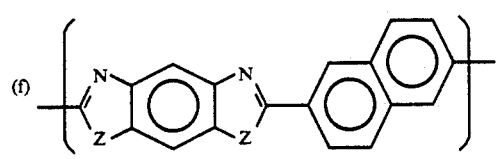

or (g) 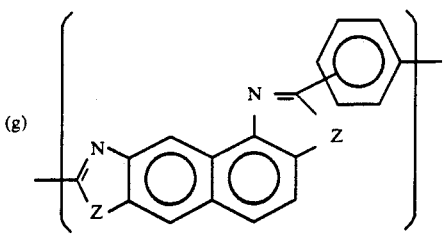

PBZ polymers used in the present invention also comprise reactive end groups linked to the PBZ block, which end groups can react to form a bond with a thermoplastic polymer or with a monomer which forms a thermoplastic polymer. Such reactive end groups are preferably either azole-forming moieties or acylation reactive groups. They are more preferably acylation reactive groups and most preferably acid groups.

PBZ polymers prepared by the standard syntheses previously described will inherently be terminated at each end by azole-forming sites. Preferably, at least one azole-forming moiety is an o-amino-basic moiety; more preferably, both are o-amino-basic moieties. ABA-PBZ polymers terminated by o-amino-basic moieties can be synthesized in a manner familiar to persons skilled in the art by adding a slight excess of the first copolymerizing monomer, which comprises two o-amino-basic moieties as previously described. PBZ polymers terminated by o-amino-basic moieties are preferably synthesized by the process illustrated in Formula 16

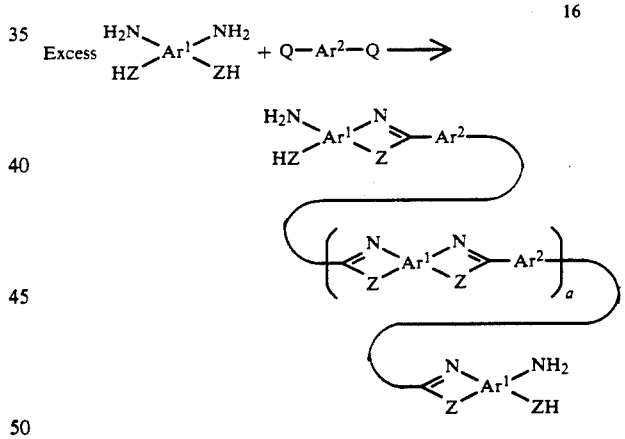

16 wherein a is a number of repeating units at least equal to 10 and all other characters have the limits and preferred embodiments previously assigned.

Synthesis of PBZ polymers terminated by acylation reactive groups is more complex. PBZ polymers terminated by acid groups can be synthesized using an excess of a diacid, such as terephthalic acid, for the second copolymerizing monomer. However, azole rings deactivate acylation reactive groups with respect to acylation in mineral acid, unless the acylation reactive group is decoupled from the azole ring.

Therefore, the PBZ polymer terminated by an acylation reactive group preferably comprises:

(1) a block of repeating PBZ units as previously described;

(2) a decoupling group, as previously defined, bonded to the PBZ block; and (3) an acylation reactive group, as previously defined, bonded to the decoupling group.

The PBZ polymer terminated by acylation reactive groups preferably comprises two decoupling groups bonded to the PBZ block and two acylation reactive groups, one being bonded to each decoupling group.

Each decoupling group may have the embodiments previously defined but preferably comprises two aromatic groups and more preferably further comprises an oxygen atom or sulfur atom linking the aromatic groups. If the acylation reactive group is an acid group, the decoupling group most preferably comprises two aromatic groups linked by an oxygen atom. If the acylation reactive group is an aromatic group, the decoupling group more preferably further comprises a second oxygen or sulfur atom linking the decoupling group to the acylation reactive group, and most preferably comprises two aromatic groups and two oxygen atoms. Moieties bonded to aromatic groups in the decoupling group are preferably in para position with respect to each other.

Each acylation reactive group is preferably an acid group as previously defined.

The PBZ polymer preferably complies with Formula 17

AC—D—(PBZ)—D—AC   17 wherein:
(PBZ) represents a PBZ block as previously defined;
each D is a decoupling group as previously described; and
each AC is an acylation reactive group as previously described.

More preferably, the PBZ polymer terminated by acylation reactive groups complies with Formula 18

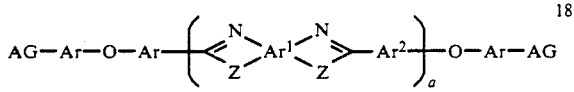

wherein AG is an acid group as previously defined and all other characters have the meanings and preferred embodiments previously given. Most preferably, the PBZ polymer terminated by acylation reactive groups complies with Formula 19

19

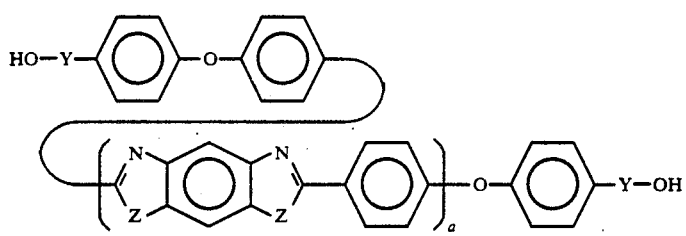

wherein Y is a sulfonyl or carbonyl group and all other characters have the meanings and preferred embodiments previously given, or the acid chloride thereof or the variation of the acid or acid chloride wherein the nitrogen atoms and the Z groups are in trans position.

PBZ polymers terminated by acylation reactive groups are synthesized by contacting a PBZ polymer terminated by an azole-forming moiety, as previously described, with an terminating monomer containing:

(1) an azole-forming moiety which can react with moieties on the rigid rod polymer;
(2) a decoupling group bonded to the azole-forming moiety; and
(3) an acylation reactive group bonded to the decoupling group under conditions the same as those used to synthesize a PBZ polymer. The azole-forming moiety on the terminating monomer is preferably an electron-deficient carbon group as previously defined. The decoupling group and the acylation reactive group have the same preferred embodiments previously used to describe the polymer terminated by an acylation reactive group. Bonds throughout the terminating monomer are preferably in meta or para position and more preferably in para position. The terminating monomer may be, for example, p-phenoxybenzoic acid, 4-phenoxyphenoxybenzoic acid, 4,4'-oxy-bis(benzoic acid), 4,4'-oxy-bis(benzoyl chloride), 4,4'-bis(benzoic acid) or 4,4'-bis(benzoic acid) sulfide. The mole ratio of terminating monomer to PBZ polymer is preferably at least about 1:1 and more preferably at least about 2:1.

Thermoplastic Polymers Useful in the Practice of the Present Invention

The present invention also uses either:
(1) a thermoplastic polymer comprising:
  (a) a thermoplastic block containing polyamide, polyimide, polyquinoxaline, polyquinoline, poly(aromatic ketone), poly(aromatic sulfone), poly(aromatic ether) or a copolymer of one of those polymers, which is stable and soluble at temperatures of at least about 50° C. in mineral acid capable of dissolving the PBZ polymer; and
  (b) at least one active end group linked to the thermoplastic block which can form a linkage with an end group on the PBZ polymer; or
(2) at least one monomer which can react in mineral acid to form a link with the PBZ polymer and to form a thermplastic polymer containing poly(aromatic ketone), poly(aromatic sulfone), poly(aromatic ether) or a copolymer of one of those polymers.

The thermoplastic block has either a plurality of repeating mer units or a formula weight of at least about 800. For most polymers, a block with a formula weight of at least 800 also comprises at least a plurality of repeating units. However, a single repeating unit of some poly(aromatic ether) copolymers, such as PBZ/poly(aromatic ether) copolymer, may have a formula weight greater than 800. The thermoplastic block preferably comprises at least about 10 repeating mer units, more preferably at least about 25 units, more highly preferably at least about 50 units and most preferably at least about 100 units. Preferred active end groups comprise acylation reactive groups or azole-forming groups. Monomers which can react in mineral acid are preferably those which form poly(aromatic ethers) or thermoplastic copolymers of poly(aromatic ethers) with another preferred polymer or with PBZ.

Polyamides

Polyamides are a well-known class of thermoplastic polymers. Polyamide polymers used in the present invention contain a plurality of units which comprise:
1) a first divalent organic moiety ($J^1$) which is stable in mineral acid up to about 50° C.; and
2) a first amide moiety having the carbonyl group bonded to the first divalent organic moiety.

Polyamide polymer units preferably further comprise:
3) a second divalent organic moiety ($J^2$) bonded to the nitrogen of the first amide moiety; and
4) a second amide moiety having the nitrogen bonded to the second divalent organic moiety.

Polyamides preferably comply with Formula 20(a) or 20(b) and more preferably with Formula 20(b):

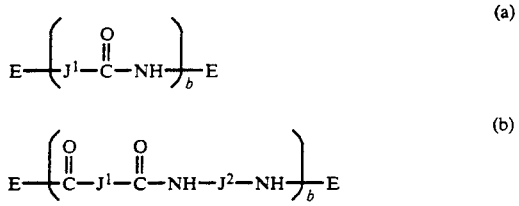

(a)

(b)

wherein $J^1$ and $J^2$ are independently divalent organic moieties as previously described, each E is an end group which comprises the remnant of a monomer or an active end group as previously described, and b is a number of units in excess of one which has the preferred embodiments set out previously for the number of units in the thermoplastic polymer.

The divalent organic moieties ($J^1$ and $J^2$) each independently preferably comprise aromatic groups. For example, the divalent organic moieties may be phenylene groups, pyridine groups, diphenyl ether groups or diphenyl methane groups. The divalent organic moieties more preferably consist essentially of aromatic groups or aromatic groups linked by ether groups. They are most preferably phenylene groups. If the divalent organic moieties are aliphatic, they preferably comprise no more than about 12 carbon atoms and more preferably no more than about 6.

At least one end group (E) must be an active end group as previously described. Preferably the polyamide comprises two active end groups. The active end groups more preferably comprise an acylation reactive group or an electron-deficient carbon group as those terms are previously defined and most preferably comprise an electron-deficient carbon group.

In polyamide copolymers, such as poly(amide-imides), at least some divalent organic moieties ($J^1$ and $J^2$) comprise a mer unit from a different type of polymer, such as the preferred polymers previously described or a PBZ unit. The copolymer is preferably a poly(amide-imide) or a poly(amide-ether), in which at least some divalent organic moieties comprise an imide group or an ether group.

Polyamides and their copolymers are prepared by a number of processes familiar to persons of ordinary skill in the art, such as by the reaction of an amine-bearing monomer with a monomer bearing an acid group, or by the reaction of a carboxylic acid bearing monomer and an isocyanate bearing monomer, or by the reaction of formaldehyde with a dinitrile. Such syntheses are described in numerous sources such as: 11 Encyclopedia of Poly. Sci. and Eng., Polyamides, 319 et seq. (John Wiley & Sons 1988); 18 Kirk-Othmer Encyclopedia of Chem. Tech., Polyamides, 328, 350-53 (John Wiley & Sons 1982); and U.S. Pat. Nos. 4,072,665; 4,087,481; 4,156,065; 4,065,441; 4,061,623; 4,094,866; 4,017,459; 4,098,775; 4,115,372; 4,467,083; 4,061,622 and 4,094,564, which are incorporated herein by reference. PBZ-unit-containing diamines useful for synthesizing PBZ/polyamide copolymers, and PBZ/polyimide copolymers, are disclosed in U.S. Pat. No. 4,087,409 and 5 J. Heterocyclic Chem. 269 (1968).

Methods for preparing polyamide terminated by an active end group are obvious to one of ordinary skill in the art. Polyamide terminated by an acid group, which is also an electron-deficient carbon group, can be synthesized by processes involving the reaction of a carboxylic acid or acid halide using a slight excess of the acid or acid halide containing monomer. If additional decoupling is needed for the acid group, the polyamide can be synthesized with a decoupled di-acid, such as 4,4'-bis(benzoic acid), or can be synthesized with a slight excess of diamine monomer and then contacted with an stoichiometric amount of decoupled diacid under reaction conditions. Polyamide terminated by an acid group can be converted to polyamide terminated by an active aromatic group by contacting it under acylation conditions with a monomer comprising two decoupled aromatic groups, such as p-diphenoxybenzene.

Polyimides

Polyimides are a known class of polymers familiar to persons of ordinary skill in the art. Polyimide units preferably comprise:
(1) a first aromatic group, and
(2) a first imide ring fused with the first aromatic group.
They more preferably further comprise:
(3) a second imide ring fused to the first aromatic group, and
(4) a second aromatic group linked by a single bond to the nitrogen of second imide ring.

Preferred polyimides comply with Formula 21:

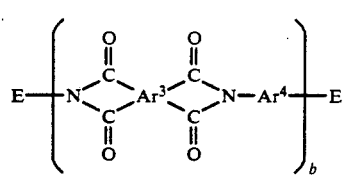

21 wherein $Ar^3$ is a first aromatic group and $Ar^4$ is a second aromatic group as previously defined, b is a number of repeating units, and each E independently comprises the remnant of a monomer or an active end group as previously defined. Reactive end groups in polyimides are more preferably acylation reactive groups or electron-deficient carbon groups and are most preferably electron-deficient carbon groups.

In polyimide copolymers, at least some of the first or second aromatic groups ($Ar^3$ or $Ar^4$) are replaced by two aromatic groups which are linked by or part of a mer unit from another type of polymer. The mer unit is preferably a PBZ unit or one from a preferred polymer as previously described. The mer unit is more preferably a polyamide or poly(aromatic ether) unit.

Polyimides and their copolymers can be synthesized by several methods familiar to persons of ordinary skill in the art, such as by the reaction of a di(acid anhydride) monomer with either a diamine monomer or a diisocyanate monomer. Possible syntheses are described in Kirk-Othmer Encyclopedia of Chemical Technology, *Polyimides*, 704 et seq. (John Wiley & Sons 1982); and U.S. Pat. Nos. 4,061,622; 4,156,065; 4,017,459; 4,061,623; 4,098,775; 4,115,372; and 4,467,083, which are incorporated herein by reference. They are preferably synthesized by the reaction of a di(acid anhydride) monomer and a diamine monomer.

Polyimide terminated by an active end group can be synthesized by methods obvious to a person of ordinary skill in the art. Polyimide terminated by an acid anhydride moiety can be converted to polyimide terminated by an acid group suitable to serve as an electron deficient carbon group either by hydrolyzing the anhydride or by contacting it with an amino acid such as p-aminobenzoic acid under reaction conditions. Polyimide terminated by an active aromatic group is synthesized by contacting anhydride-terminated polyimide with a monomer comprising an amine group and two decoupled aromatic groups, such as phenoxyaniline.

Polyquinoxalines

Polyquinoxalines are a known class of thermoplastic polymers. Polyquinoxalines preferably contain a plurality of units, each of which comprises:
(1) a first quinoxaline moiety;
(2) a second quinoxaline moiety;
(3) a bond or a divalent organic moiety linking the carbocyclic rings of the first and second quinoxaline moiety; and
(4) an aromatic group ($Ar^5$) bonded to the nitrogen containing ring of the second quinoxaline moiety.

Polyquinoxalines more preferably further comprise a aromatic group bonded ortho to one nitrogen atom in each quinoxaline moiety.

Polyquinoxalines preferably comply with the formula in Formula 22:

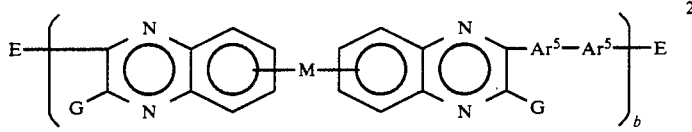

wherein each G is either a hydrogen atom or an aromatic group, $Ar^5$ is an aromatic group, each E independently comprises an active end group as previously described or the remnant of a monomer, b is a number of repeating units greater than 1 and having the preferred embodiments previously described and M is a bond or a divalent organic moiety such as oxygen, sulfur, 1,1,1,3,3,3-hexafluoroisopropylene or methylene. Preferably, there is no divalent organic moiety and M is a bond. If there is a divalent organic moiety (M), it is preferably an aromatic group. The aromatic group $Ar^5$ is preferably a diphenylene ether moiety. Preferably, each G is an aromatic group.

Polyquinoxalines are prepared by known and well reported reactions, such as the reaction of an aromatic bis-(o-diamine) monomer with an aromatic bisglyoxal hydrate or a bis(phenyl-α-diketone) in a solvent such as m-cresol. Such reactions and useful polymers made thereby are described in 7 Encyclopedia of Poly. Sci. & Eng., *Heat-Resistant Polymers*, 652-654 (John Wiley & Sons 1987), which is incorporated herein by reference.

Active end groups (E) preferably comprise o-aminobasic moieties which have two primary amine groups. Polyquinoxalines terminated by o-diamine moieties can be synthesized by the reactions described previously using an slight excess of aromatic bis-(o-diamine) monomer. Polyquinoxalines terminated by an electron-deficient carbon group, an acid group, or an aromatic group can be synthesized by contacting the polymer which is terminated by o-diamine moieties under PBZ polymerizing conditions with a stoichiometric amount of diacid monomer such as terephthalic acid, decoupled diacid monomer such as 4,4'-oxy-bis(benzoic acid), or monomer comprising an aromatic group such as p-(4-phenoxyphenoxy)benzoic acid.

Polyquinolines

Polyquinolines are a known class of polymers containing repeating units which comprise quinoline moieties. Each polyquinoline unit preferably comprises:
(1) a first quinoline moiety;
(2) a first aromatic group bonded to the first quinoline moiety in a position para to the quinoline nitrogen atom;
(3) a second quinoline moiety bonded to the first aromatic group, said bond being in a position para to the quinoline nitrogen atom; and
(4) a second aromatic group bonded to the second quinoline moiety in a position ortho to the quinoline nitrogen.

Units are preferably joined by a bond from the second aromatic group of one unit to the first quinoline moiety of another unit, said bond being to the ortho position with respect to the quinoline nitrogen. The first and second aromatic groups each preferably independently comprise a diphenylene ether moiety.

Polyquinolines preferably comply with Formula 23:

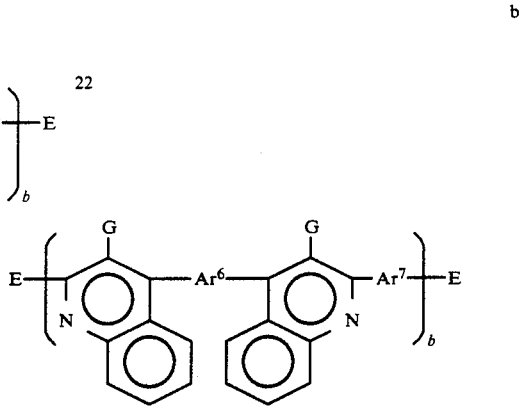

wherein G' is either a hydrogen atom or an aromatic group, each E independently comprises the remnant of a monomer or an active end group, $Ar^6$ is a first aromatic moiety as previously described, $Ar^7$ is a second aromatic moiety as previously described, and b is a number of repeating units greater than 1 having the preferred embodiments set out previously.

Polyquinolines are synthesized by known reactions such as the reaction of a di(phenyl acetyl) monomer and a bis(o-aminoketone) monomer in a mixture of m-cresol and polyphosphoric acid. Such reactions and useful polyquinolines produced by them are described in 7 Encyclopedia of Poly. Sci. & Eng., *Heat-Resistant Polymers*, 654-655 (John Wiley & Sons, 1987), which is incorporated herein by reference.

Active end groups on the polyquinoline preferably comprise a carboxylic acid halide moiety. Polyquinolines terminated by an aromatic amine moiety can be synthesized by ordinary processes using a slight excess of bis-(o-aminoketone) monomer. The amine-terminated polyquinoline can be contacted with a diacid chloride monomer as described for forming polyamide under conditions appropriate to form an amide linkage, thereby forming an acid chloride terminated polymer. Other end groups can be attached to the acid chloride terminated polymer as previously described.

Poly(aromatic ketones) and poly(aromatic sulfones) and poly(aromatic ethers)

Poly(aromatic ketones), poly(aromatic sulfones) and poly(aromatic ethers) are well-known classes of related thermoplastic polymers familiar to persons of ordinary skill in the art. The polymers contain a plurality of units comprising aromatic groups linked by carbonyl groups, sulfonyl groups, decoupling groups and/or oxygen atoms.

The poly(aromatic ketone) and poly(aromatic sulfone) units preferably comprise:
1) a first plurality of aromatic groups;
2) a number of decoupling groups sufficient to link the first plurality of aromatic groups; and
3) a first carbonyl or sulfonyl group bonded to one of the aromatic groups, and more preferably further comprise:
4) a divalent organic moiety (T) bonded to the first carbonyl or sulfonyl group; and
5) a second carbonyl or sulfonyl group bonded to the divalent organic moiety.

Individual units are linked by bonds from the second carbonyl or sulfonyl group of one unit to an aromatic group in an adjacent unit. Divalent organic moieties must be stable in mineral acid up to at least about 50° C. They preferably comprise aromatic groups and more preferably consist essentially of aromatic groups or aromatic groups linked by sulfur or oxygen atoms. The first plurality of aromatic groups linked by decoupling groups preferably comprises 3 aromatic groups. The maximum number is not critical and is limited only by the ability to construct and react corresponding monomers. The first plurality of aromatic groups conveniently comprises no more than about 4 aromatic groups.

Poly(aromatic ketones) and poly(aromatic sulfones) preferably comply with Formula 24(a)

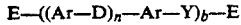

E—((Ar—D)$_n$—Ar—Y)$_b$—E      24(a)

and more preferably comply with Formula 24(b):

E—((Ar—D)$_n$—Ar—Y—T—Y)$_b$—E wherein
each E independently comprises the remnant of a monomer or an active end group moiety as previously described,
each D independently is a decoupling group as previously defined,
each Ar is independently an aromatic group as previously defined,
each Y is independently a sulfonyl or carbonyl group as previously defined,
T is a divalent organic moiety as previously defined,
n is a number of repeating units equal to 1 or more and
b is a number of repeating mer units greater than 1 and having the preferred embodiments set out previously.

Poly(aromatic ethers) are poly(aromatic ketones) or poly(aromatic sulfones) in which at least some decoupling groups (D) are oxygen atoms. Preferably, all decoupling groups are oxygen atoms.

Poly(aromatic ketones), poly(aromatic sulfones) and poly(aromatic ethers) are commercially available. They can also be synthesized by numerous processes familiar to persons of ordinary skill in the art. Examples of those processes are described in 18 Kirk-Othmer Encyclopedia of Chemical Technology, *Polyethers*, 605–610 (1982); Mullins et al., "The Synthesis and Properties of Poly(aromatic Ketones)," 27 JMS-Rev. Macromol. Chem. Phys. 313–335 (1987), and U.S. Pat. Nos. 4,654,410; 4,711,945; 3,886,121; 4,232,142; 4,239,884; 4,550,140; 4,716,211; 3,264,536; 4,065,437; 4,474,932; 4,229,564; 4,704,448; 3,953,400 and 3,065,205 which are incorporated herein by reference. Preferred syntheses involve either the polymerization of a self-polymerizing monomer comprising an acid group and a decoupled aromatic group or the copolymerization of a diacid monomer comprising two acid groups and a diaromatic monomer comprising two decoupled aromatic groups in the presence of a Friedel-Crafts acylation catalyst such as aluminum chloride. Preferred syntheses are described in U.S. Pat. Nos. 4,229,564; 4,704,448 and 3,065,205.

The present invention can also employ thermoplastic poly(aromatic ether) copolymers comprising a plurality of mer units of other polymers which are stable in mineral acid up to about 50° C. The copolymers preferably comprise mer units of the preferred thermoplastic polymers identified previously or PBZ units. The copolymers are more preferably poly(amide-ether) copolymers, poly(imide-ether) copolymers or PBZ/poly(aromatic ether) copolymers. They are most preferably PBZ/poly(aromatic ether) copolymers.

Poly(aromatic ether) copolymers preferably comply with the more preferred poly(aromatic ether) description given previously, wherein a polymer unit comprises at least one unit of a different polymer as part of the divalent organic moiety (T). For instance, in a poly(amide-ether) unit the divalent organic moiety (T) highly preferably comprises at least two aromatic groups linked by at least one amide group. In a poly(imide-ether) unit, the divalent organic moiety preferably comprises at least two aromatic groups linked by at least one aromatic-diimide group. In a PBZ/poly(aromatic ether) unit copolymer, the divalent organic moiety highly preferably comprises at least two aromatic groups linked by at least one benzoxazole, benzothiazole or benzimidazole group. Preferably, divalent organic moieties (T) in at least about half of the units of a copolymer comprise a unit of the different polymer; more preferably at least about 75 percent do and most preferably about all do.

As persons of ordinary skill in the art will recognize, any discussion of the number of PBZ units, polyamide units, etc. per poly(aromatic ether) unit in a copolymer frequently deals with average structures. In a copolymer which averages about 1 PBZ unit per poly(aromatic ether) unit, the divalent organic moiety (T) in one poly(aromatic ether) unit may comprise 2 or 3 PBZ units and in another unit may comprise none. The same is true for other copolymers. In poly(aromatic ethers) useful in the present invention, the divalent organic moiety in each unit may comprise up to nine units of the other polymer, but preferably comprises on average no more than about three units of the other polymer, more preferably comprises on average no more than two units and most preferably comprises on average one unit.

The thermoplastic PBZ/poly(aromatic ether) polymers preferably comprise units which conform to Formula 24(b) wherein T conforms to Formula 25(a)

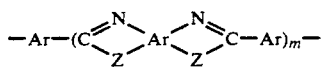   25(a)

and m is a number of repeating units from 0 to 9 averaging more than 0, preferably on average from 0.5 to 3, and most preferably on average 1, and all other characters have the meanings previously given. T is highly preferably as shown in Formula 25(b):

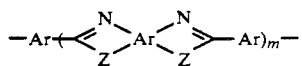   25(b)

and more highly preferably as shown in Formulae 25(c) or (d):

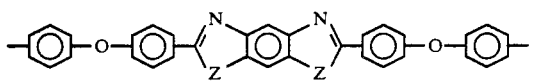   (c)

or

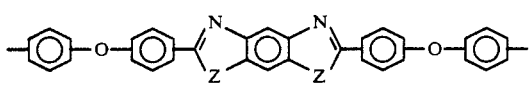   (d)

25

Most preferably, oxygen atoms, PBZ units, and bonds linking the T group to other moieties i the polymer are bonded to the aromatic groups in para position with respect to one another.

Mer units of other polymers may also be incorporated into the moiety comprising a plurality of aromatic groups linked by decoupling groups. For instance, copolymer units may conform to the preferred or more preferred descriptions for poly(aromatic ether) units wherein each unit further comprises:

6) a polyamide, polyimide, polyquinoxaline, polyquinoline or PBZ mer unit linked to the first plurality of aromatic groups;
7) a second plurality of aromatic groups, one of which is bonded to the polyamide, polyimide, polyquinoxaline, polyquinoline or PBZ mer unit; and
8) a number of decoupling groups sufficient to link the second plurality of aromatic groups.

Such copolymers preferably conform to Formula 26(a) or (b) and more preferably to Formula 26(b):

E—((Ar—O)$_n$—Ar—Mer—Ar—(O—Ar)-$_n$—Y)$_b$—E   26(a)

E—((Ar—O)$_n$—Ar—Mer—Ar—(O—Ar)-$_n$—Y—T—Y)$_b$—E   26(b)

wherein Mer is a unit comprising an amide, imide, quinoxaline or quinoline moiety or a PBZ unit and all other characters have the meaning previously assigned.

Such copolymers are synthesized in the same manner as poly(aromatic ethers) either by the self-polymerization of a monomer comprising a acid group and an active aromatic group or by the copolymerization of a diacid monomer with a monomer comprising decoupled aromatic groups under Friedel-Crafts acylation conditions as described in U.S. Pat. Nos. 4,229,564; 4,704,448 and 3,065,205. At least some of the diacid monomers, the diaromatic monomers or the self-polymerizing monomers should contain amide, imide, quinoxaline, quinoline, PBZ or other suitable units. Suitable monomers and synthesis of copolymers with them are described in Raychem Corp., *Aromatic Polyether Ketones Having Imide, Amide, Ester, Azo, Quinoxaline, Benzimidazole, Benzoxazole or Benzothiazole Groups and a Method of Preparation,* International (PCT) application WO86/02368 (published Apr. 24, 1986), which is incorporated herein by reference.

Preferably, the copolymer is synthesized using a diacid or di(acid chloride) monomer comprising a unit from another polymer. The formula of the diacid monomer preferably complies with that set out for the divalent organic moiety (T) described above terminated by two acid groups. For instance, diacid chloride monomers comprising on the average about 1 PBZ unit per monomer can be synthesized by contacting one mole of a compound comprising aromatic group having 2 o-amino-basic moieties, such as 2,5-diaminohydroquinone or 4,6-diaminoresorcinol, with at least two moles a diacid chloride, such as terephthaloyl chloride or 4,4'-oxy-bis(benzoyl chloride), under conditions for synthesizing PBZ polymers. The average number of PBZ units per monomer, can be raised in a manner obvious to persons of ordinary skill in the art by slightly lowering the excess of diacid chloride used to form the monomer.

Poly(aromatic ketones), poly(aromatic sulfones) poly(aromatic ketones) and copolymers thereof are preferably terminated by end groups comprising an acid group, an active aromatic group, or an electron-deficient carbon group. Polymers terminated by acid groups which are also electron-deficient carbon groups are readily synthesized by using a slight excess of diacid or di(acid chloride) monomer. Polymers terminated by active aromatic groups are readily synthesized using a slight excess of monomer comprising two decoupled aromatic groups.

Monomers Polymerizable in Mineral Acid

The process of the present invention may alternatively use monomers which can react in the mineral acid to form a link with the PBZ polymer and to form a thermoplastic polymer containing poly(aromatic ketone), poly(aromatic sulfone) or poly(aromatic ether) or a copolymer of one of those polymers. The monomers are preferably suitable for preparing poly(aromatic ethers) or poly(aromatic ether) copolymers. They are more preferably suitable for preparing poly(aromatic ethers) or PBZ/poly(aromatic ether) copolymers. They are most preferably suitable for preparing PBZ/poly(aromatic ether) copolymers.

The synthesis of poly(aromatic ethers) in mineral acid is described in Ueda et al., "Synthesis of Polyketones by Direct Polycondensation of Dicarboxylic Acids with Diaryl Compounds using Phosphorus Pentoxide/Methanesulfonic Acid as Condensing Agent and Solvent," 5 Makromol. Chem., Rapid Commun. 833-36 (1985) and Ueda et al., "Synthesis of Poly(phenylene ether sulfone) by direct self-polycondensation of Sodium 4-Phenoxybenzenesulfonate using Phosphorus Pentoxide/Methanesulfonic Acid as Condensing Agent and Solvent," 6 Makromol. Chem., Rapid Commun. 271-74 (1985), which are incorporated herein by reference.

The monomers are those useful for synthesis of poly(aromatic ether) by Friedel-Crafts acylation. Self-polymerizing monomers comprise an acid group and a decoupled aromatic group. Copolymerization involves the reaction of a diacid monomer comprising two acid groups linked by a divalent organic moiety (T) with a diaromatic moiety comprising two aromatic groups linked by a decoupling group. However, mineral acids are not ordinarily as effective catalysts as are Lewis acids for Friedel-Crafts-type polymerization. Therefore, when the catalyst and solvent is a mineral acid, such as polyphosphoric acid or methanesulfonic acid, more extensive decoupling is frequently needed between reactive sites in the monomers, such as aromatic groups and acid groups, and deactivating groups. The importance of decoupling and several appropriate decoupled monomers are discussed in Colquhoun, "Synthesis of Polyetherketones in Trifluoromethanesulfonic Acid," 25(2) Polymer Preprints 17-18 & Table 2 (1984), which is incorporated by reference.

In diacid monomers, which comprise two acid groups linked by a divalent organic moiety, for instance, the divalent organic moiety (T) preferably comprises 2 aromatic groups and more preferably further comprises a decoupling group, such as an oxygen atom, linking the two aromatic groups. The divalent organic moiety (T) may alternatively comprise an aliphatic group which functions to decouple the acid groups, but it preferably does not. Diacid monomers may be, for example, 4,4'-bis(benzoic acid), 4,4'-oxy-bis(benzoic acid), p-bis(4-oxybenzoic acid)benzene or the acid chloride of those acids. Terephthaloyl chloride and terephthalic acid ordinarily form only low molecular weight polymer in mineral acid.

Diacid monomers preferably conform to Formula 27:

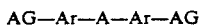

AG—Ar—A—Ar—AG      27 wherein each AG is independently an acid group as previously defined, each Ar is independently an aromatic group as previously defined, and A is either a bond or a decoupling group as previously defined. More preferably, A is an oxygen atom.

In diacid monomers comprising a mer unit from a different type of polymer, such as a PBZ unit, the two acid groups are preferably linked by:
1) a first decoupling group comprising an aromatic group bonded to one acid group;
2) one to nine mer units from a PBZ polymer or a thermoplastic polymer as previously described; and
3) a second decoupling group comprising an aromatic group bonded to the second acid group.

Decoupling groups preferably comprise two aromatic groups and more preferably further comprise an oxygen atom linking those aromatic groups. Mer units are preferably PBZ units.

Diacid monomers for forming PBZ/poly(aromatic ether) copolymers may conform to Formula 27, wherein A preferably complies with Formula 28(a);

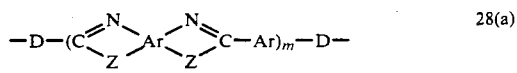

more preferably complies with Formula 28(b);

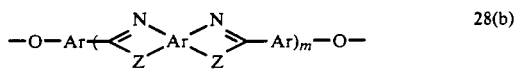

and more highly preferably complies with either Formula 8(c) or (d)

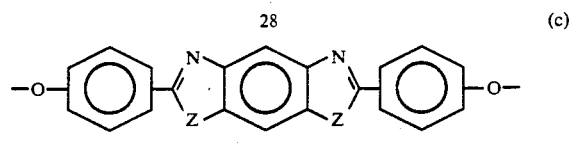

or

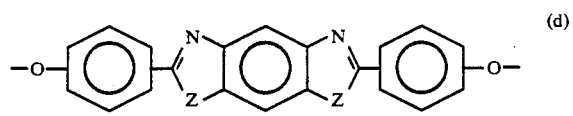

wherein all characters have the meanings previously given. Most preferably, each Ar is a phenylene ring and all bonds to the phenylene rings are in para position with respect to each other.

Although monomers consisting of 2 phenyl rings linked by an oxygen atom are known to react in mineral acid under some conditions to form low molecular weight polymer, diaromatic monomers, as that term is previously defined, preferably comprise three aromatic groups linked by decoupling groups. The decoupling groups are preferably oxygen atoms. If an aromatic group is bonded to two decoupling groups, those groups are preferably bonded para to each other. The monomer may be, for example, p-diphenoxybenzene or 4,4'-diphenoxybiphenyl. If the diaromatic monomer comprises a mer unit from another polymer, that mer unit is preferably linked to the reactive aromatic group by a decoupling group comprising two aromatic groups and two ether groups.

Self-polymerizing monomers likewise preferably comprise a decoupling group, having two aromatic groups and two ether linkages, which links the active aromatic group to the acid group. For instance, the self-polymerizing monomer may be, p-(4-phenoxyphenyl) benzoic acid, p-(4-phenoxyphenoxy)benzoic acid or their acid chlorides.

Poly(aromatic ethers) formed in mineral acid reflect the limitations on monomers which may be used. Polymer units preferably comprise:
1) first, second and third aromatic groups linked by ether linkages; and
2) a first carbonyl or sulfonyl moiety bonded to the third aromatic group, and more preferably further comprise:
3) a divalent organic moiety having a fourth aromatic group bonded to the first carbonyl or sulfonyl group and a fifth aromatic group linked to the fourth aromatic group; and 4) a second carbonyl or sulfonyl group bonded to the fifth aromatic group.

Polymer units most preferably further comprise an oxygen atom linking the fourth and fifth aromatic groups. Polymer units preferably conform to one of Formulae 24(a) or (b), wherein each D is an oxygen atom, T is a divalent aromatic moiety as previously described, n is at least 2 and all other characters have the meanings previously assigned.

PBZ/poly(aromatic ether) copolymer units synthesized in mineral acid preferably comprise:
1) a first, second and third aromatic group linked by ether groups;
2) a first carbonyl or sulfonyl moiety bonded to the third aromatic group;
3) a fourth aromatic group bonded to the first carbonyl or sulfonyl group;
4) a first decoupling group bonded to the fourth aromatic group;
5) a PBZ unit having a fifth aromatic group fused to a first and a second azole ring, the first azole ring being linked at the 2-carbon to the first decoupling group;
6) a second decoupling group linked to the 2-carbon of the second azole ring;
7) a sixth aromatic group bonded to the second decoupling group; and
8) a second carbonyl or sulfonyl group bonded to the sixth aromatic group.

Decoupling groups preferably comprise an aromatic group and more preferably further comprise an ether group.

PBZ/poly(aromatic ether) copolymer units synthesized in mineral acid preferably conform with Formula 24(b), wherein each T is a moiety of the Formula:

—Ar—A—Ar—  29 and each A is a bond or a group as illustrated in one of Formulae 28(a)–(d).

End groups of poly(aromatic ethers) and copolymers synthesized in mineral acid are as described previously for such polymers, subject to the following discussion of block copolymers.

Block Copolymer Compositions

PBZ polymers and thermoplastic polymers which can be dissolved or synthesized in mineral acid can be incorporated into block copolymers of the present invention, such as diblock, triblock and multiblock copolymer compositions. The terms block copolymer, diblock, triblock and multiblock are well-known in the art of polymer chemistry and have the definition given in 2 Encyclopedia of Polymer Science and Engineering, *Block Copolymers,* 324–26 (John Wiley & Sons 1987), which is incorporated herein by reference. Without intending to be bound thereby, it is theorized that block copolymers of the present invention are substantially linear, as opposed to being graft copolymers.

Block copolymers of the present invention comprise:
1) a block of PBZ polymer, as previously described; and
2) a block of thermoplastic polymer linked to the PBZ block and comprising polyamide, polyimide, polyquinoxaline, polyquinoline, poly(aromatic ketone), poly(aromatic sulfone), poly(aromatic ether) or a copolymer of one of those polymers.

PBZ blocks preferably comprise a rigid rod PBZ polymer, as previously described, and more preferably comprise poly(benzo-bis-oxazole). Thermoplastic blocks preferably comprise polyamide, poly(aromatic ether) or a copolymer of such a polymer. Thermoplastic blocks more preferably comprise a poly(aromatic ether) or a PBZ/poly(aromatic ether) copolymer and most preferably comprise a PBZ/poly(aromatic ether) copolymer.

PBZ and thermoplastic blocks within the block copolymer are preferably linked by a linking group (L) which comprises
1) the remnant of the active end group of the PBZ polymer, and
2) the remnant of either
an active end group of a thermoplastic polymer, or
a monomer as previously described which polymerizes in mineral acid to form a thermoplastic poly(aromatic ketone), poly(aromatic sulfone) or poly(aromatic ether).

The linking group preferably comprises:
1) a first decoupling group;
2) a carbonyl or sulfonyl group bonded to the first decoupling group;
3) a first aromatic group bonded to the carbonyl or sulfonyl group; and
4) a second decoupling group bonded to the aromatic group.

The first decoupling group preferably comprises a second and a third aromatic group; more preferably further comprises an oxygen or sulfur atom linking the second and third aromatic groups; and most preferably comprises an oxygen atom linking the second and third aromatic groups. The carbonyl or sulfonyl group is preferably carbonyl. The first aromatic group has the preferred embodiments previously defined for aromatic groups. The second decoupling group preferably comprises a fourth and a fifth aromatic group; more preferably further comprises decoupling groups such as oxygen or sulfur atoms linking the first, fourth and fifth aromatic groups; and most preferably comprises oxygen atoms linking the first, fourth and fifth aromatic groups. Preferably, the first decoupling group is bonded to the PBZ block and the second decoupling group is bonded to the thermoplastic block.

Linking groups (L) comprise a moiety which preferably conforms to Formula 30(a), —D—Y—Ar—D— 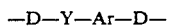 30(a)

more preferably conforms to Formula 30(b),

—Ar—AA—Ar—Y—Ar—D—Ar—D—Ar— 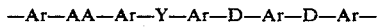 30(b)

and most preferably conforms to Formula 30(c),

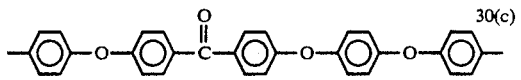 30(c)

wherein
each D is individually a decoupling group as previously defined,
each Y is a carbonyl or sulfonyl group,
each Ar is an aromatic group as previously defined, and
AA is an oxygen or sulfur atom.

Less preferred variations of L may comprise a moiety conforms to either 30(d) or 30(e):

—D—Y—Ar—(O—Ar)$_n$—Y—D— 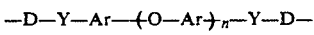 30(d)

$$-D-Ar-Y-D-Y-Ar-D- \quad 30(e)$$

wherein n is a number of repeating units at least equal to one and preferably at least equal to 2, and all other characters have the meanings previously assigned.

When two moieties are bonded to an aromatic ring, other than within a benzoxazole, benzothiazole or benzimidazole moiety, they are most preferably in para position with respect to each other. This is particularly preferable in linking groups, poly(aromatic ethers), poly(aromatic ketones), poly(aromatic sulfones) and copolymers thereof.

The weight proportions of the PBZ polymer blocks and thermoplastic polymer blocks within the block copolymer may vary in any proportions from about 99 percent PBZ to about 99 percent thermoplastic. As the proportions of PBZ block decrease, the physical properties of the block copolymer become less like those of the corresponding PBZ homopolymer and more like those of the thermoplastic polymer, in a manner familiar to persons skilled in the art of block copolymer chemistry. For instance, as the proportions of PBZ decrease, the tensile modulus of the polymer decreases, but its glass transition temperature approaches that of the thermoplastic homopolymer and its solubility in various acids improves.

The optimal proportions depend upon the desired levels of strength and processability for the polymer. In most cases, however, it will be preferred that neither the PBZ blocks nor the thermoplastic blocks make up less than about 5 percent on average of the weight of the polymer. More preferably, neither makes up less than about 10 percent. More highly preferably, neither makes up less than about 20 percent. Most preferably, neither makes up less than about 30 percent.

Physical properties of the block copolymers are also dependent upon a number of other factors, such as the chemical structure of the PBZ blocks, the chemical structure of the thermoplastic blocks, the amount of homopolymer mixed in with the block copolymer, and the lengths of the PBZ and thermoplastic blocks. Preferred block lengths are already set out in describing the PBZ and thermoplastic polymers.

Block copolymers of the present invention preferably comprise a moiety which complies with Formula 31

$$+(PBZ+L+thermoplastic+L)_c \quad 31$$

wherein
the block marked (PBZ) represents a PBZ polymer as previously described;
the block marked (thermoplastic) represents a thermoplastic polymer as previously described;
the moiety L is a bond or a linking group as previously defined; and
c is a number of units equal to or greater than one.
Each PBZ block preferably comprises at least 10 units chosen from those illustrated in Formulae 12, 13, 14(a)-(d) and 15 (a)-(g), and more preferably comprises at least 10 units illustrated in Formula 12 or 14(a)-(d).
Each thermoplastic block preferably comprises either a single unit with a formula weight of at least 800 or a plurality of units, chosen from those illustrated in Formulae 20(a)-(b), 21, 22, 23, 24(a)-(b), or 26(a)-(b) in connection with 25(a)-(d). Each L is preferably a linking group as previously described and is more preferably chosen from one of those illustrated in Formulae 30(a)-(e).

Block copolymers of the present invention more preferably comprise a moiety which complies with one of Formulae 32(a)-(f)

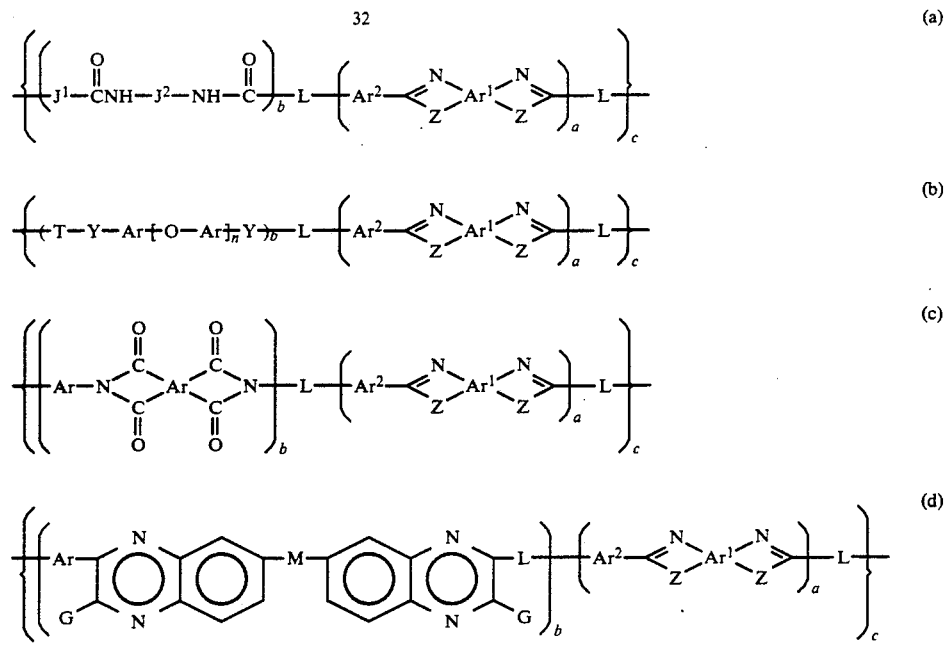

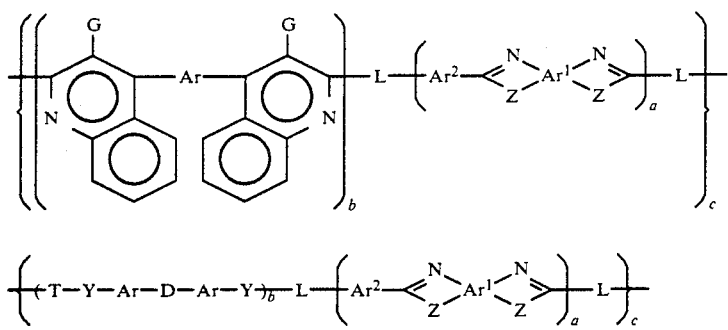

(e)

(f)

wherein:
each Ar is an aromatic group as previously defined;
each $Ar^1$ is a first aromatic group in a PBZ unit as previously defined;
each $Ar^2$ is a second aromatic group in a PBZ unit as previously defined;
each Z is an oxygen atom, a sulfur atom, or a nitrogen atom bearing an organic substituent, which may be in cis or trans position on $Ar^1$;
D is a decoupling group as previously defined;
$J^1$ and $J^2$ respectively are first and second divalent organic moieties in a polyamide polymer as previously defined;
T is a divalent organic moiety as previously defined each L is a bond or a linking group as previously illustrated in Formulae 30(a)–(e);
a is a number of repeating PBZ units as previously defined;
b is a number of repeating thermoplastic units as previously defined;
c is a number of units equal to one or more; and
n is a number of repeating decoupled aromatic units as previously defined for poly(aromatic ketones), poly(aromatic sulfones) and poly(aromatic ethers) and copolymers thereof.

Block copolymers having a PBZ block and a PBZ/poly(aromatic ether) block more preferably comprise a moiety which complies with the Formula 33(a)

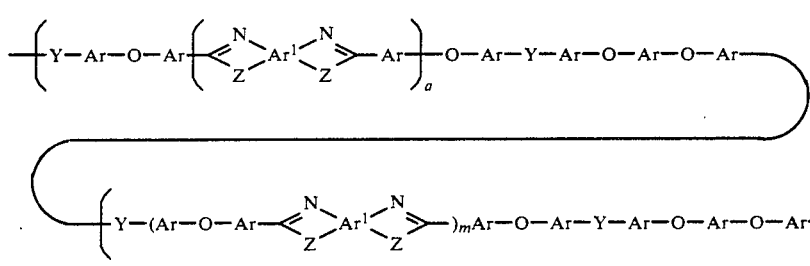

33(a)

for poly(aromatic ketones), poly(aromatic sulfones) and poly(aromatic ethers) and copolymers thereof;

and most preferably comprise a moiety which essentially complies with Formula 33(b)

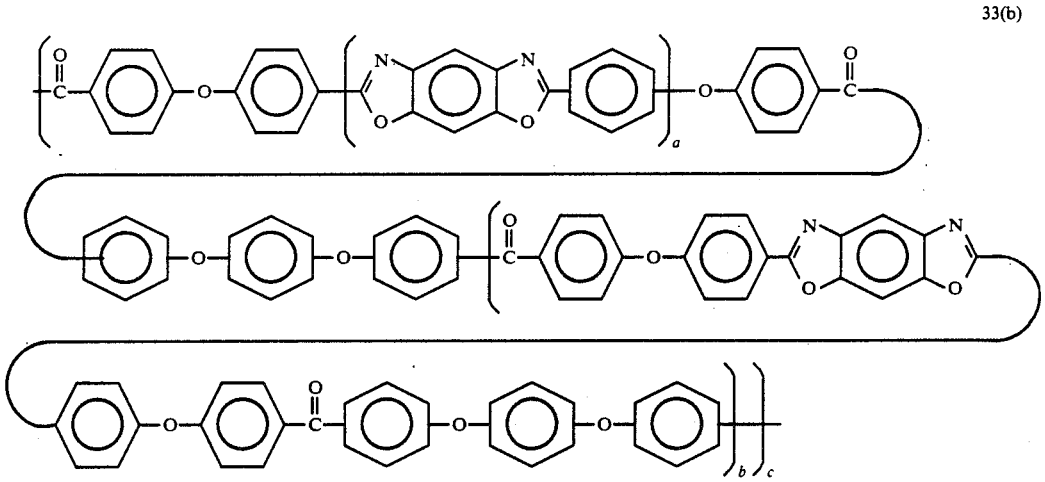

33(b)

M is a bond or a divalent organic moiety as previously defined for polyquinoxalines;
each G is independently hydrogen or an aromatic group;

wherein m is a number of repeating units within a thermoplastic PBZ/poly(aromatic ether) copolymer as previously described, and each other character has the meaning and preferred embodiments previously set out.

Block copolymers of the present invention are preferably synthesized by contacting a PBZ polymer terminated by an active end group with either a thermoplastic polymer terminated by an active end group or a monomer which will react to form a thermoplastic polymer and will react to form a linkage with the active end group. The reaction is preferably either between a PBZ polymer and a thermoplastic polymer, both terminated by azole-forming groups; or between a PBZ polymer and a thermoplastic polymer, both terminated by acylation reactive groups; or between a PBZ polymer terminated by an acylation reactive group and one or more monomers which react to form poly(aromatic ether) or a copolymer of poly(aromatic ether).

The first process comprises the step of contacting:
(1) a PBZ polymer which is terminated by a first azole-forming group; and
(2) a thermoplastic polymer comprising polyamide, polyimide, polyquinoxaline, polyquinoline, poly(aromatic ketone), poly(aromatic sulfone), poly(aromatic ether) or a copolymer of one of those polymers which is stable in mineral acid and which is terminated by a second azole-forming group capable of reacting with the first azole-forming group to form an azole ring,
in a mineral acid solution under conditions such that the PBZ polymer and thermoplastic polymer react to form a block copolymer.

PBZ polymers and thermoplastic polymers terminated by azole-forming groups are previously described. The thermoplastic polymer is preferably polyamide, polyquinoxaline, poly(aromatic ether) or a copolymer thereof. It is more preferably polyamide or a copolymer thereof. The weight ratio of polymers used in the reaction has the same limits and preferred embodiments as the weight ratio of thermoplastic blocks and PBZ blocks within the product block copolymer. More preferably, the molar quantities of the two polymers are such that substantially all PBZ polymer is part of a block copolymer. Most preferably, the two polymers are also used in equimolar quantities or the thermoplastic polymer is in a molar excess.

Preferably, one polymer is terminated by an o-amino-basic moiety and the other is terminated an electron-deficient carbon group when the polymers are initially contacted. However, it is also within the scope of the present invention to contact two polymers terminated by electron-deficient carbon groups in the presence of a monomer comprising two o-amino-basic moieties, or to contact two polymers terminated by o-amino-basic moieties in the presence of a monomer comprising two electron-deficient carbon groups. In either case, the monomer will react with one polymer or the other to terminate it with an appropriate azole-forming site. Appropriate monomers are described in the section on PBZ synthesis.

The reaction is carried out in mineral acid which can dissolve both polymers. The mineral acid is preferably polyphosphoric acid or a mixture of methane-sulfonic acid and phosphorus pentoxide. The conditions are the same as those for the synthesis of PBZ polymer, except that the temperature of the reaction must remain at a level at which the thermoplastic polymer is stable in mineral acid. The maximum temperature varies for different thermoplastic polymer blocks, but is preferably less than about 150° C. and more preferably no more than about 125° C.

In the reaction, the azole-forming group on the thermoplastic polymer and the azole-forming group on the PBZ polymer react to form an azole ring which links the two polymers. The remnants of the two active end groups form an additional PBZ unit which is attached to the PBZ polymer block. Therefore, the resulting polymer preferably comprises a moiety conforming to one of Formulae 32(a)-(f), wherein each L is a bond.

The second process comprises the step of contacting:
(1) a PBZ polymer that is terminated on at least one end by a decoupled acylation reactive group; and
(2) a thermoplastic polymer which is stable in mineral acid under reaction conditions and is terminated on at least one end group by a second acylation reactive group capable of reacting with the first acylation reactive group
in a mineral acid solution under conditions such that they react to form a block copolymer.

PBZ polymers and thermoplastic polymers terminated by acylation reactive groups have previously been discussed. The thermoplastic polymer is preferably a polyamide, a poly(aromatic ether) or a PBZ/polyaromatic ether copolymer and more preferably a poly(aromatic ether) or a PBZ/polyaromatic ether copolymer. The weight ratio of polymers employed in the reaction has the same limits and preferred embodiments as the weight ratio of thermoplastic blocks and PBZ blocks within the product block copolymer. More preferably, the molar quantities of the two polymers are such that substantially all PBZ polymer is part of a block copolymer. Most preferably, the two polymers are also used in equimolar quantities or the thermoplastic polymer is in a molar excess.

Preferably, one polymer is terminated by an acid group and the other by an active aromatic group when the polymers are initially contacted. However, it is also within the scope of the present invention to contact two polymers terminated by acid groups in the presence of a monomer comprising two decoupled aromatic groups, or to contact two polymers terminated by active aromatic groups in the presence of a monomer comprising two acid groups. In either case, the monomer will react with one polymer or the other to terminate it with an appropriate acylation reactive group. Examples of appropriate monomers are described in the section on acid polymerizable monomers.

The mineral acid preferably comprises polyphosphoric acid or methanesulfonic acid; more preferably comprises a mixture of methanesulfonic acid and phosphorus pentoxide; and most preferably comprises a 10-1 mixture by weight of methanesulfonic acid and phosphorus pentoxide. The reaction conditions are similar to those for synthesizing poly(aromatic ethers) in mineral acids as described in the Ueda references which were incorporated by reference previously. The temperature of the reaction may be any at which it proceeds. The temperature is preferably more than about 0° C., more preferably at least about 25° C. and most preferably at least about 50° C. The temperature should not go above that at which the polymers are stable. Although that varies considerably between different thermoplastic polymers, the temperature is preferably less than about 150° C. and more preferably no more than about 125° C. Pressure is not critical as long as the mineral acid remains liquid. The reaction is preferably run under inert atmosphere, such as nitrogen, argon or helium and most preferably under nitrogen.

Polymers synthesized by the process comprise a linking group (L) which links the PBZ block and thermoplastic block as previously described. When the thermoplastic block is a poly(aromatic ether) or copolymer thereof, the linking group preferably comprises the same moieties as the thermoplastic block and may be indistinguishable from it. When the reaction is between two acid terminated polymers and a diaromatic monomer, the linking group preferably conforms to Formula 30(d). When the reaction is between two aromatic terminated polymers and a diacid monomer, the linking group preferably conforms to Formula 30(e). Otherwise, the linking group preferably conforms to one of Formulae 30(b) or 30(c).

The third process comprises the step of contacting:
(1) a PBZ polymer which is terminated on at least one end by a decoupled acylation reactive group; and
(2) one or more monomers having two acylation reactive groups which can react in the acid to form a thermoplastic polymer and to form a linkage with the acylation reactive group on the PBZ polymer, in a mineral acid solution under conditions such that a block copolymer is formed. The third process is preferred, although it is limited to producing Poly(aromatic ethers) and copolymers thereof. Appropriate PBZ polymers and monomers are discussed previously. The monomers are preferably appropriate for synthesizing poly(aromatic ether) or PBZ/poly(aromatic ether) copolymer and are more preferably appropriate for synthesizing PBZ/poly(aromatic ether) copolymer.

The weight ratios of PBZ polymer to monomer have the same limitations and preferred embodiments previously used to describe the weight ratio of PBZ block to thermoplastic block within the product block copolymer. The mineral acid solvent-catalyst and the reaction conditions are identical to those previously described for the second process. Like the polymers produced by the second process, polymers synthesized by the third process comprise a linking group (L) which may be indistinguishable from the thermoplastic poly(aromatic ether) or copolymer bonded to it.

The product of each method of synthesis is a polymer composition as previously described. Block copolymers within the composition are theorized to be ordinarily a mixture of diblock, triblock and/or multiblock copolymers whose lengths and proportions vary, depending upon the reagents used and their relative proportions. It is further theorized that the composition ordinarily comprises some thermoplastic polymer which is not linked to a PBZ block. The composition may further comprise some PBZ polymer which is not linked to a thermoplastic block, but it preferably comprises essentially no PBZ homopolymer. Preferably, the proportions of thermoplastic and PBZ polymers outside of block copolymers in the composition are minimized. Polymer compositions of the present invention may also comprise one or more additives as described in U.S. Pat. No. 4,533,693 at col. 84, which is incorporated herein by reference. The properties of the polymer composition will vary depending upon the polymers therein and their relative proportions.

The product of the reaction can be precipitated simply by neutralizing the mineral acid solvent, for instance with water. Block copolymers having substantial PBZ content can be isolated by either washing with or precipitation from solvents which can effectively dissolve the thermoplastic homopolymer polymer, but not the PBZ homopolymer. Preferably essentially all PBZ blocks in the resulting polymer compositions are linked to a thermoplastic block and essentially all thermoplastic blocks are linked to a PBZ block. Alternatively, the dope of block copolymer in the mineral acid can be fabricated into useful films or fibers by the processes described hereinafter.

Fabrication and Physical Properties of Items Using Polymer Compositions of the Present Invention.

The present invention comprises a polymer composition containing PBZ polymer moieties and thermoplastic polymer moieties which can be formed into fibers, films and compression molded articles having a high tensile modulus. Fibers and films are preferably formed from the uncoagulated dope which results from the reaction of the PBZ polymer with the thermoplastic polymer or monomers which form thermoplastic polymer. The dope is preferably first degassed under elevated temperature and/or reduced pressure, such as about 80° C. and about 0.4 in Hg.

Fibers are spun by known techniques familiar to persons of ordinary skill in the art. See, e.g., U.S. Pat. No. 4,533,693 at col. 82–84; Hwang et al., "Solution Processing and Properties of Molecular Composite Fibers and Films," 23 Poly. Eng. & Sci. 784, 785 (1984); and Hwang et al., "Composites on a Molecular Level: Phase Relationships, Processing, and Properties," B22(2) J. Macromol. Sci.-Phys. 231, 234–35 (1983), which are incorporated by reference. The dope is forced through a temperature-controlled spinnerette by a piston which extrudes the dope as a thin stream. The stream of dope falls into a bath which dilutes the acid in the dope and coagulates the spun fiber. The coagulation bath is preferably water. The fiber is then stretched under tension, for instance by spin-drawing, to a maximum elongation, and is washed to remove acid still in the fiber. The fiber is then dried and heat treated by subjecting it temperatures at or above its glass transition temperature while it is under tension, for instance from spin-drawing. The fiber preferably undergoes a further elongation during heat treatment. The extent of elongation is not critical, but the fiber is preferably stretched to the maximum. The minimum elongation is frequently at least about 3 percent to about 10 percent, and is frequently at most about 30 percent to about 15 percent. Heat treatment may increase the tensile strength of the polymer by up to about 30 percent or more.

The physical properties of fibers of the present invention are dictated to a great extent by the chemical composition and relative proportions of PBZ and thermoplastic polymer in the fiber. Under similar processing conditions, polymer compositions comprising less PBZ component will have lower tensile modulus and lower glass transition temperatures than compositions comprising higher PBZ content.

Fibers comprising at least about 30 percent PBZ by weight preferably have a tensile strength before heat treatment of at least about 40 ksi, more preferably at least about 55 ksi, more highly preferably at least about 70 ksi and most preferably at least about 90 ksi. (1 ksi = 1000 psi). Fibers comprising 30 percent PBZ by weight preferably have a tensile strength after heat treatment of at least about 50 ksi, more preferably at least about 75 ksi, more highly preferably at least about 100 ksi and most preferably at least about 110 ksi. The tensile modulus of the fiber before heat treatment is preferably at least about 2.0 Msi, more preferably at least about 2.5 Msi, more highly preferably at least about 3.5 Msi and most preferably 4.5 Msi. (1 Msi = 1,000,000 psi). The tensile modulus of a heat-treated fiber is preferably at least about 3.5 Msi, more preferably at least about 4.5 Msi, more highly preferably at least about 6.0 Msi and most preferably at least about 7.5 Msi. The elongation to break prior to heat treating is preferably from about 1 percent to about 30 percent and is more preferably from about 10 percent to about 15 percent. The elongation to break of heat-treated fiber is preferably from about 6 percent to about 19 percent.

Fibers comprising at least about 50 percent PBZ by weight preferably have a tensile strength before heat treatment of at least about 58 ksi and more preferably at least about 79 ksi. Fibers comprising 50 percent PBZ by weight preferably have a tensile strength after heat treatment of at least about 70 ksi, more preferably at least about 85 ksi, more highly preferably at least about 100 ksi and most preferably at least about 130 ksi. The tensile modulus of the fiber before heat treatment is preferably at least about 3.0 Msi, more preferably at least about 3.8 Msi and most preferably about 7.1 Msi. The tensile modulus of a heat-treated fiber is preferably at least about 6.0 Msi, more preferably at least about 8.0 Msi, more highly preferably at least about 10 Msi and most preferably at least about 14 Msi. The elongation to break prior to heat treating is preferably from about 14 percent to about 18 percent. The elongation to break of heat-treated fiber is preferably from about 4.4 percent to about 15 percent.

Fibers comprising at least about 70 percent PBZ by weight preferably have a tensile strength after heat treatment of at least about 100 ksi, more preferably at least about 125 ksi and most preferably at least about 175 ksi. The tensile modulus of a heat-treated fiber is preferably at least about 12 Msi, more preferably at least about 20 Msi and most preferably at least about 25 Msi. The elongation to break of heat-treated fiber is preferably from about 1.6 percent to about 5 percent.

Polymer compositions of the present invention may also be formed into films. Processes for making films are reported in the same references previously incorporated in the description of fiber processing. For instance, the degassed dope is extruded through a die under controlled temperature onto a rotating drum which is partially submerged in a coagulating bath such as water. The bath coagulates the film, which is stretched, washed to remove acid within the film and dried. Films are not ordinarily heat-treated.

Films comprising at least about 30 percent PBZ by weight preferably have a tensile strength of at least about 20 ksi, more preferably at least about 25 ksi and most preferably at least about 50 ksi. The tensile modulus of the film is preferably at least about 1 Msi, more preferably at least about 2.5 Msi and most preferably at least about 4.3 Msi. The elongation to break of the film is preferably from about 5 percent to about 31 percent and more preferably from about 12 percent to about 20 percent.

Films comprising at least about 50 percent PBZ by weight preferably have a tensile strength of at least about 20 ksi, more preferably at least about 40 ksi and most preferably at least about 80 ksi. The tensile modulus of the film is preferably at least about 1 Msi, more preferably at least about 3.0 Msi and most preferably at least about 6.0 Msi. The elongation to break of the film is preferably from about 4 percent to about 40 percent.

Polymer compositions and block copolymers of the present invention and articles formed from them are preferably thermoplastic, although the glass transition temperature varies substantially depending upon the chemical composition of the block copolymer and the polymer composition. Desirable glass transition temperatures also vary depending upon the proposed use for the polymer. Under ordinary circumstances, the glass transition temperature is preferably no more than about 400° C., more preferably no more than about 350° C., more highly preferably no more than about 300° C. and most preferably no more than about 280° C. Under ordinary circumstances, the glass transition temperature is preferably at least about 100° C., more preferably at least about 200° C., and most preferably at least about 250° C.

Block copolymers and polymer compositions of the present invention and articles made from them preferably are not substantially phase separated. They preferably do not experience substantial phase separation even upon heating up to their glass transition temperature. They more preferably do not experience substantial phase separation when heated to at least about 25° C. beyond their glass transition temperature. However, fibers and films, particularly heat-treated fibers, may suffer some loss of tensile strength and modulus if heated for long periods above their glass-transition temperature without tension.

Films can be fabricated into laminates useful for making objects by methods known for making laminates out of thermoplastic films, such as compression molding at a temperature above the glass transition temperature of the film. Furthermore, powders of the polymer composition can be compression molded by known techniques at a temperature above the glass transition temperature of the polymer to make useful articles. Powders can be made by precipitating the polymer dope in a blender, washing out any remaining acid, drying the product and grinding the resulting product in a grinder.

ILLUSTRATIVE EMBODIMENTS

The following examples are given to illustrate the invention and should not be interpreted as limiting it in any way. Unless stated otherwise, all parts and percentages are given by weight.

EXAMPLE 1

Synthesis of dope comprising cis-polybenzoxazole in polyphosphoric acid

In the amounts shown below in Table 1, 4,6-diaminoresorcinol dihydrochloride (DAHB) and terephthaloyl chloride (TC) are mixed in polyphosphoric acid (PPA) containing about 76 percent phosphorous pentoxide by weight under nitrogen atmosphere. The mixture is stirred vigorously and heated for 16 hours at 45° C. The temperature is raised to 95° C. and additional phosphorous pentoxide is added as shown in Table 1. The reaction is continued with stirring for 8 hours at 95° C., for 16 hours at 150° C. and for 24 hours at 190° C. The resulting dopes are stored sealed under nitrogen atmosphere until needed. The polymers synthesized comprise repeating units as illustrated in Formula 14(a) predominantly terminated by o-amino-basic moieties as illustrated in Formula 16 wherein Z is an oxygen atom.

To measure inherent viscosity ($\leftarrow$), the polymer is isolated by coagulating a portion of the polymer in water, drying the polymer, grinding it to a fine powder, extracting impurities with water and drying under temperatures of about 170° C. and pressures of about 3 mmHg. The isolated polymer is dissolved at room temperature in methanesulfonic acid in a concentration of about 0.05 g/dL. The inherent viscosity of the resulting solution at 25° C. is measured in a Schott-Gerate CT 150 bath in an Ubelhobde tube.

TABLE I

| Sample | DAHB (g) | DAHB (mmol) | TC(g) | TC (mmol) | PPA(g) | $P_2O_5$ Added(g) | $\eta$(dL/g) |
|---|---|---|---|---|---|---|---|
| A | 7.5 | 35.2 | 6.93 | 34.1 | 31.4 | 17.9 | 6.42 |
| B | 75 | 352 | 69.3 | 341 | 314 | 179 | * |
| C | 7.5 | 35.2 | 6.82 | 33.6 | 31.4 | 17.9 | 9.96 |
| D | 100.00 | 469.4 | 90.52 | 445.9 | 414.4 | 244.2 | 5.08 |
| E | 100.0 | 469.4 | 93.86 | 462.3 | 405.7 | 248.3 | 16.9 |
| F | 50.00 | 234.7 | 46.57 | 229.4 | 201.5 | 124.8 | 9.53 |
| G | 100.00 | 469.4 | 90.52 | 445.9 | 411.0 | 247.6 | 6.25 |
| H | 100.00 | 469.4 | 90.52 | 445.9 | 413.9 | 231.8 | 4.04 |
| I | 10.00 | 46.9 | 8.86 | 43.6 | 41.2 | 22.9 | 3.27 |
| J | 50.00 | 234.7 | 45.26 | 222.9 | 206.0 | 116.8 | 5.27 |

*not measured

EXAMPLE 2

Synthesis of cis-PBO/polyamide block copolymer

A polyamide terminated by electron deficient carbon groups is synthesized. 14.10 g (69.45 mmol) of terephthaloyl chloride is dissolved in 400 ml of N-methylpyrrolidinone under nitrogen atmosphere with mechanical stirring. 13.49 g (67.37 mmol) of bis-(4-aminophenyl) ether and 4.29 g of calcium chloride are added to the solution and washed down with 100 ml of N-methylpyrolidinone. After 1½ hours, 9.72 g of calcium chloride and 5.45 g of calcium oxide are added to the mixture and stirring is continued for about 10 hours. The polyamide is precipitated with water in a blender, collected by filtration and washed. 20.49 g of polyamide are recovered. The inherent viscosity in concentrated sulfuric acid (concentration 0.5 g/dL) is measured as in Example 1 to be 0.388 dL/g.

Under nitrogen atmosphere, 3 g of the polyamide and 15.05 g of the dope from Example 1(B) are added with stirring to 84 g of 10-1 mixture of methanesulfonic acid and phosphorous pentoxide by weight (hereinafter referred to as 10-1 methanesulfonic acid solution). The mixture is heated with stirring for 16 hours at 70° C. and for 48 hours at 90° C. The resulting polymer conforms to Formula 32(a) wherein $J^1$ is a p-phenylene group, $J^2$ is a 4,4'-diphenylene ether group, each L is a bond, $Ar^2$ is a p-phenylene group, each Z is oxygen and $Ar^1$ is a 1,2,4,5-tetravalent benzene ring. An aliquot of the resulting dope is cast on a glass slide and coagulated with water to yield a clear, amber film. The remainder of the polymer is coagulated in water, washed, dried, ground, rewashed and redried. Its inherent viscosity in methanesulfonic acid is 4.07 dL/g.

EXAMPLE 3

Synthesis of cis-PBO/polyamide block copolymer

A polyamide is prepared from isophthaloyl chloride and 4-chloro-1,3-diaminobenzene as described in Example 2. Under nitrogen atmosphere, 5.68 g of polyamide and 17.4 g of dope prepared in Example 1(D) are added with stirring to 83.0 g of a 10-1 solution of methanesulfonic acid and phosphorous pentoxide by weight. The mixture is heated for 16 hours at 50° C. 0.083 g of 4,4'-oxybis(benzoyl chloride) are added and washed down with 6.8 g of 10-1 methanesulfonic acid solution. The solution is heated an additional 24 hours at 50° C. and 24 hours at 70° C. The polymer is coagulated with water and isolated as described in Example 2. Its inherent viscosity in methanesulfonic acid is 5.61 dL/g.

EXAMPLE 4

Synthesis of cis-PBO/polyamide block copolymer

A polyamide is prepared as described in Example 2. 12.4 g of dope from Example 1(D) are dissolved in 60 ml of a 10-1 methanesulfonic acid solution. The mixture is heated for 16 hours at 90° C. 4.06 g of polyamide are added and heating is continued for 4 hours at 50° C. 0.10 g of 4,4'-oxybis(benzoyl chloride) are added to the solution and washed down with 6 ml of 10-1 methanesulfonic acid and phosphorous pentoxide. Heating and stirring are continued for 20 hours at 50° C. and 80 hours at 70° C. The polymer is precipitated and isolated as described in Example 2.

EXAMPLE 5

Synthesis of cis-PBO/polyamide block copolymer

A polyamide terminated by active aromatic groups is synthesized Under nitrogen atmosphere, 193 ml of N-methylpyrolidinone and 39 ml of pyridine are added with stirring and warming to 11.6 g of calcium chloride and 3.9 g of lithium chloride. 2.09 g (19.3 mmol) of m-phenylenediamine, 2.92 g (17.6 mmol) of isophthalic acid, 1.07 g (3.51 mmol) of 4-phenoxyphenoxybenzoic acid, and 11.99 g (38.6 mmol) of triphenylphosphite are added under nitrogen atmosphere to a reaction vessel. The N-methylpyrrolidinone and pyridine mixture is added to the reaction vessel with stirring. The contents are stirred for about 10 hours at 110° C. The functionally terminated polyamide is precipitated in a blender by a 1:1 solution of water and methanol. The polymer is washed twice with the precipitating solution and once with methanol. The polymer is dried in a vacuum oven. Its inherent viscosity in sulfuric acid (conc. 0.5 g/dL) is 0.175 dL/g.

An acid terminated polybenzoxazole is synthesized. 16.7 g of dope from Example 1(G) is mixed with 60 g of 10-1 methanesulfonic acid solution under nitrogen atmosphere with stirring 0.59 g of oxybis(benzoyl chloride) are added to the solution and washed down with 5.9 g of 10-1 methanesulfonic acid solution. The mixture is heated with stirring for 16 hours at 90° C.

2.30 g of polyamide are added to the mixture and washed down with 16.8 g of 10-1 methanesulfonic acid solution. The solution is heated for 4 hours at 50° C. 0.20 g of p-diphenoxybenzene are added and washed down with 13.3 g of 10-1 methanesulfonic acid solution. Heating is continued 50° C. for 72 hours. The resulting polymer conforms predominantly to Formula 32(a) wherein $J^1$ is a m-phenylene group, $J^2$ is an m-phenylene group, $Ar^2$ is a p-phenylene group, each Z is oxygen, $Ar^1$ is a 1,2,4,5-tetravalent benzene ring and each L complies with Formula 30(c) wherein the diphenoxycarbonyl moiety is bonded to PBZ polymer. (When L is bonded to Ar$^2$, Ar$^2$ serves as one of the p-phenylene rings in Formula 30(c)).

A film is cast as described in Example 2 which is strong, amber-colored and clear. Viscosity and methanesulfonic acid is measured as described in Example 1. The inherent viscosity of the polymer is 9.23 dL/g.

EXAMPLE 6

Synthesis of block copolymer using about 30 percent polybenzoxazole polymer and about 70 percent PBO/poly(aromatic ether ketone)-forming monomer by weight Under nitrogen atmosphere, 1.50 g (7.04 mmol) of 4,6-diaminoresorcinol dihydrochloride and 4.25 g (14.40 mmol) of 4,4'-oxybis(benzoyl chloride) are dissolved in 74 ml of 10-1 methanesulfonic acid and phosphorous pentoxide solution. The solution is heated with stirring for 1 hour at 70° C. and for 24 hours at 90° C. 17.50 g of PBO dope from Example 1(A) is added and heating is continued for 24 hours at 90° C. The mixture is cooled to 50° C., and 1.93 g (7.36 mmol) p-diphenoxybenzene is added. Heating and stirring are continued at 50° C. for 48 hours. The block copolymer is isolated as described in Example 2. Its inherent viscosity in methanesulfonic acid is 12.4 dL/g.

EXAMPLE 7

Synthesis of block copolymer using about 30 percent polybenzoxazole polymer and about 70 percent PBO/poly(aromatic ether ketone)-forming monomer by weight 15 g of 4,6-diaminoresorcinol dihydrochloride and 42.5 g of 4,4'-oxybis(benzoyl chloride) are mixed with stirring in 500 ml of 10-1 methanesulfonic acid solution. The mixture is heated at 70° C. for 2 hours and at 90° C. for 24 hours. 87.5 g of PBO dope from Example 1(B) are added and heating is continued at 90° C. for 24 hours. A further 87.5 g of the same dope are added and heating is continued at 90° C. for an additional 24 hours. 19.30 g of p-diphenoxybenzene are added to the solution with 220 ml of 10-1 methanesulfonic acid solution at 50° C. The mixture is heated at 50° C. for 64 hours. The polymer is isolated as described in Example 2.

EXAMPLE 8

Synthesis of block copolymer using about 30 percent polybenzoxazole polymer and about 70 percent PBO/poly(aromatic ether ketone)-forming monomer by weight Under nitrogen atmosphere, 1.25 g (5.85 mmol) of 4,6-diaminoresorcinol dihydrochloride and 3.25 g (12.6 mmol) of 4,4'-oxybis(benzoic acid) are mechanically stirred with 100 g of 10-1 methanesulfonic acid solution. The mixture is heated with stirring for 24 hours at 90° C. 14.74 g of PBO dope from Example 1(G) are added and stirring is continued for 48 hours at 90° C. 1.65 g of p-diphenoxybenzene are added and washed down with 37.3 g of 10-1 methanesulfonic acid solution. Stirring is continued for 72 hours at 50° C. The polymer is isolated as described in Example 2. Its inherent viscosity in methanesulfonic acid is 10.2 dL/g.

EXAMPLE 9

Synthesis of block copolymer using about 30 percent polybenzoxazole polymer and about 70 percent PBO/poly(aromatic ether ketone)-forming monomer by weight Under a nitrogen atmosphere, 1.25 g (5.87 mmol) of 4,6-diaminoresorcinol dihydrochloride and 3.72 g (12.6 mmol) of 4,4'-oxybis(benzoyl chloride) and 1.65 g (6.29 mmol) of p-diphenoxybenzene are mixed with 93.8 g of polyphosphoric acid containing about 76 percent P$_2$O$_5$ by weight. The mixture is stirred for 16 hours at 45° C. Three 14.7 g quantities of phosphorous pentoxide are added and stirring is continued for 8 hours at 95° C. 14.5 g of PBO dope from Example 1(D) are added and heating is continued for 64 hours at 95° C. The polymer is precipitated as described in Example 2. Its inherent viscosity in methanesulfonic acid is 8.46 dL/g.

EXAMPLE 10

Synthesis of block copolymer using about 30 percent polybenzoxazole polymer and about 70 percent PBO/poly(aromatic ether ketone)-forming monomer by weight Under a nitrogen atmosphere, 1.26 g (5.91 mmol) of 4,6-diaminoresorcinol dihydrochloride and 3.60 g (12.2 mmol) of 4,4'-oxybis(benzoyl chloride) are mixed with 100 g of 10-1 methanesulfonic acid solution. The mixture is heated for 2 hours at 70° C. and for 16 hours at 90° C. 14.6 g of PBO dope of Example 1(F) are added and the solution is heated for 48 hours at 90° C. 1.60 g of p-diphenoxybenzene are added and washed down with 39.4 g of 10-1 methanesulfonic acid solution. Heating is continued for 64 hours at 50° C. The polymer is isolated as described in Example 2. It has an inherent viscosity of 15.7 dL/g.

EXAMPLE 11

Synthesis of block copolymer using about 30 percent polybenzoxazole polymer and about 70 percent PBO/poly(aromatic ether ketone)-forming monomer by weight 1.26 g of 4,6-diaminoresorcinol dihydrochloride and 3.53 g of 4,4'-oxybis(benzoyl chloride) are dissolved in 125.67 g of 10-1 methanesulfonic acid solution. The mixture is heated for about 2 hours at 70° C. and for 20 hours at 90° C. 14.64 g of PBO dope from Example 1(E) and stirring is continued for 44 hours at 90° C. 1.57 g of p-diphenoxybenzene is added and washed down with 25.9 g of 10-1 methanesulfonic acid solution, and stirring is continued for 68 hours at 50° C. The polymer is isolated and has an inherent viscosity of 12.6 dL/g.

EXAMPLE 12

Synthesis of block copolymer using about 30 percent polybenzoxazole polymer and about 70 percent PBO/poly(aromatic ether ketone)-forming monomer by weight Under a nitrogen atmosphere, 2.08 g of 4,6-diaminoresorcinol dihydrochloride and 6.18 g of 4,4'-oxybis(benzoyl chloride) are mixed in 129.2 g of 10-1 methanesulfonic acid solution with stirring. The solution is heated for 2 hours at 70° C. and for 24 hours at 90° C. 24.29 g of dope from Example 1(D) is added and stirring is continued for 48 hours at 90° C. The temperature is reduced to 50° C. and 2.75 g of p-diphenoxybenzene is added to the mixture and washed down with 19.7 g of 10-1 methanesulfonic acid solution. Heating and stirring are continued at 50° C. for 48 hours. The resulting polymer is isolated as described in Example 2 and has an inherent viscosity of 16.0 dL/g.

EXAMPLE 13

Synthesis of block copolymer using about 30 percent polybenzoxazole polymer and about 70 percent PBO/poly(aromatic ether ketone)-forming monomer by weight 11 35 g of 4,6-diaminoresorcinol dihydrochloride and 33.71 g of 4,4'-oxybis(benzoyl chloride) are mixed under nitrogen atmosphere with 580.75 g of 10-1 methanesulfonic acid solution. The mixture is heated with stirring for 2 hours at 70° C. and for about 24 hours at 90° C. 132.5 g of PBO dope from Example 1(D) is added to the mixture with 211.2 g of 10-1 methanesulfonic acid solution. Heating and stirring are continued for 48 hours at 90° C. The temperature is reduced to 50° C. and 15.00 g of p-diphenoxybenzene are added and washed down with 456.04 g of 10-1 methanesulfonic acid solution. Heating and stirring are continued for 72 hours at 50° C. The polymer is precipitated as previously described and has an inherent viscosity of 11.75 dL/g.

EXAMPLE 14

Synthesis of block copolymer using about 30 percent polybenzoxazole polymer and about 70 percent PBO/poly(aromatic ether ketone)-forming monomer by weight 1.5 g of 4,6-diaminoresorcinol dihydrochloride and 4.25 g of 4,4'-oxybis(benzoyl chloride) are mixed with 121.2 g of 10-1 methanesulfonic acid solution. The mixture is heated with stirring for 2 hours at 70° C. and for 24 hours at 90° C. 17.50 g of PBO dope from Example 1(B) are added and heating is continued for 24 hours at 90° C. 1.93 g of p-diphenoxybenzene are added and the reaction is continued with stirring for 48 hours at 50° C. The block copolymer is isolated as previously described and has an inherent viscosity of 12.1 dL/g.

EXAMPLE 15

Synthesis of block copolymer using about 70 percent polybenzoxazole polymer and about 30 percent PBO/poly(aromatic ether ketone)-forming monomer by weight Under a nitrogen atmosphere, 0.55 g of 4,6-diaminoresorcinol dihydrochloride and 2.16 g of 4,4'-oxybis(benzoyl chloride) are mixed with 71.2 g of 10-1 methanesulfonic acid solution. The mixture is heated with stirring for about 2 hours at 70° C. and for about 20 hours at 90° C. 35.58 g of PBO dope from Example 1(G) are added and heating is continued with stirring for 48 hours at 90° C. The temperature is reduced to 50° C. and 0.96 g of p-diphenoxybenzene is added and washed down with 31 g of 10-1 methanesulfonic acid solution. The reaction is continued for 72 hours at 50° C. The polymer is isolated as described in Example 2 and has an inherent viscosity of 17.1 dL/g.

EXAMPLE 16

Synthesis of block copolymer using about 70 percent polybenzoxazole polymer and about 30 percent PBO/poly(aromatic ether ketone)-forming monomer by weight 0.33 g of 4,6-diaminoresorcinol dihydrochloride and 1.29 g of 4,4'-oxybis(benzoyl chloride) are mixed with 70 g of 10-1 methanesulfonic acid solution. The mixture is heated for 2 hours at 70° C. and for 16 hours at 90° C. 21.1 g of PBO dope from Example 1(F) are added and heating is continued with stirring for 48 hours at 90° C. The temperature is reduced to 50° C. 0.57 g of p-diphenoxybenzene are added and washed down with 26.7 g of 10-1 methanesulfonic acid solution. Heating and stirring are continued at 50° C. for 64 hours. The polymer composition is isolated as described in Example 2 and has an inherent viscosity of 11.5 dL/g.

EXAMPLE 17

Synthesis of block copolymer using about 70 percent polybenzoxazole polymer and about 30 percent PBO/poly(aromatic ether ketone)-forming monomer by weight The procedures of Example 15 is repeated using 0.71 g of 4,6-diaminoresorcinol dihydrochloride, 3.12 g of 4,4'-oxybis(benzoyl chloride), 48.6 g initial amount of 10-1 methanesulfonic acid solution, 45.00 g of PBO dope from Example 1(I), 1.39 g of p-diphenoxybenzene and 32.1 g of 10-1 methanesulfonic acid solution to wash down the p-diphenoxybenzene. The polymer composition has an inherent viscosity of 12.4 dL/g.

EXAMPLE 18

Synthesis of block copolymer using about 30 percent polybenzoxazole polymer and about 70 percent PBO/poly(aromatic ether ketone)-forming monomer by weight The procedure of Example 16 is followed using 11.37 g of 4,6-diaminoresorcinol dihydrochloride, 33.90 g of 4,4'-oxybis(benzoyl chloride), 514 g of initial 10-1 methanesulfonic acid solution, 134.7 g of PBO dope from Example 1(G), 436.5 g of methanesulfonic acid solution to wash down the PBO dope, 15.06 g of p-diphenoxybenzene and 307.3 g of 10-1 methanesulfonic acid solution to wash down the p-diphenoxybenzene. The resulting polymer composition has an inherent viscosity of 14.4 dL/g.

EXAMPLE 19

Synthesis of block copolymer using about 50 percent polybenzoxazole polymer and about 50 percent PBO/poly(aromatic ether ketone)-forming monomer by weight The procedure of Example 6 is followed using 1.33 g of 4,6-diaminoresorcinol dihydrochloride, 4.33 g of 4,4'-oxybis(benzoyl chloride), 61.5 g of 10-1 methanesulfonic acid solution, 36.23 g of PBO dope from Example 1(D) and 26.6 g of 10-1 methanesulfonic acid solution to wash it down, 1.93 g of p-diphenoxybenzene and 14.7 g of 10-1 methanesulfonic acid solution to wash it down. The resulting polymer composition has an inherent viscosity of 14.5 dL/g.

EXAMPLE 20

Synthesis of block copolymer using about 50 percent polybenzoxazole polymer and about 50 percent PBO/poly(aromatic ether ketone)-forming monomer by weight The procedure of Example 13 is repeated using 0.53 g of 4,6-diaminoresorcinol dihydrochloride, 1.71 g of 4,4'-oxybis(benzoyl chloride) and 51.91 g initial 10-1 methanesulfonic acid solution, 14.52 g of cis-PBO dope from Example 1(G) and 0.76 g of p-diphenoxybenzene with 45.8 g 10-1 methanesulfonic acid solution to wash it down. The resulting polymer composition has an inherent viscosity of 12.3 dL/g.

EXAMPLE 21

Synthesis of block copolymer using about 50 percent polybenzoxazole polymer and about 50 percent PBO/poly(aromatic ether ketone)-forming monomer by weight Under nitrogen atmosphere, 3.29 g of 4,6-diaminoresorcinol dihydrochloride and 10.71 g of 4,4'-oxybis(benzoyl chloride) are mixed with 428.4 g of 10-1 methanesulfonic acid solution. The mixture is heated with stirring for 2 hours at 70° C. and 22 hours at 90° C. 90.77 g of PBO dope from Example 1(G) are added and the reaction is continued with stirring for 48 hours at 90° C. The temperature of the mixture is reduced to 50° C. 4.76 g of p-diphenoxybenzene are added and washed down with 181.96 g of 10-1 methanesulfonic acid solution. Heating and stirring are continued for 72 hours at 50° C. The polymer is isolated as described in Example 2 and has an inherent viscosity of 15.8 dL/g.

EXAMPLE 22

Synthesis of block copolymer having cis-PBO blocks and PBO/poly(aromatic ether ketone) thermoplastic blocks wherein thermoplastic block units contain on average more than one PBO unit per aromatic ether ketone unit 1.14 g of 4,6-diaminoresorcinol dihydrochloride and 2.54 g of 4,4'-oxybis(benzoyl chloride) are mixed under nitrogen atmosphere with 90.34 g of 10-1 methanesulfonic acid solution. The solution is heated for about 2 hours at 70° C. and about 20 hours at 90° C. 12.86 g of PBO dope from Example 1(D) are added to the mixture and heating and stirring are continued at 90° C. for about 23 hours. The temperature is reduced to 50° C. 0.752 g of p-diphenoxybenzene are added and rinsed down with 31.87 g of 10-1 methanesulfonic acid solution. Heating and stirring for 48 hours at 50° C. The polymer composition is isolated as described in Example 2 and has an inherent viscosity of 12.05 dL/g.

EXAMPLE 23

Block copolymer in which the thermoplastic block contains poly(sulfonyl-dibenzoxazole ether ketone Under nitrogen atmosphere, 2.17 g of 4,4'oxybis(benzoyl chloride) and 1.25 g of 3,3'-diamino-4,4'-dihydroxydiphenylsulfone dihydrochloride monohydrate are mixed with stirring with 49.4 g of 10-1 methanesulfonic acid solution. The mixture is heated for 2 hours with stirring at about 70° C. and about 16 hours at about 90° C. 9.79 g of PBO dope from Example 1(D) is added and the reaction is continued with stirring for about 48 hours at 90° C. The reaction temperature is reduced to about 50° C. 0.965 g of p-diphenoxybenzene are added and washed down with 43.7 g of 10-1 methanesulfonic acid solution. The reaction is continued for 72 hours at 50° C. The polymer is isolated as described in Example 2 and has an inherent viscosity of 10.8 dL/g.

EXAMPLE 24

Block copolymer wherein PBO units of the thermoplastic polymer contain methyl substituents The procedure of Example 16 is followed using 2.80 g of 4,4'-oxybis(benzoyl chloride), 1 g of 2 methyl-4,6-diaminoresorcinol dihydrochloride, 76 g initial 10-1 methanesulfonic acid solution, 11.5 g PBO dope from Example 1(D) and 1.25 g of p-diphenoxybenzene washed down with 31.5 g of 10-1 methanesulfonic acid solution. The heating for 16 hours and 48 hours are at 95° C. rather than 90° C. The resulting polymer composition has an inherent viscosity of 7.01 dL/g.

EXAMPLE 25

Block copolymer wherein the thermoplastic contains both AB- and ABA-PBO units 3.06 g of 3-amino-4-hydroxybenzoic acid hydrochloride monohydrate and 1.57 g of 4,6-diaminoresorcinol dihydrochloride are mixed in 110.3 g of 10-1 methanesulfonic acid solution under nitrogen atmosphere. The mixture is heated for 24 hours at 90° C. 4.77 g of 4,4'-oxybis(benzoic acid) is added and washed down with 14.0 g of 10-1 methanesulfonic acid solution. The mixture is heated for 2 hours at 70° C. and for 4 hours at 90° C. 23.6 g of PBO dope from Example 1(D) is added and the reaction is continued for 24 hours at 90° C. The mixture is cooled to about 50° C. 2.12 g of p-diphenoxybenzene are added and washed down with 9.7 g of 10-1 methanesulfonic acid solution. The reaction is continued with stirring for about 64 hours at 50° C. The polymer is isolated as described in Example 2 and has an inherent viscosity of 8.88 dL/g.

EXAMPLE 26

Block copolymer containing polybenzoxazole block and poly(aromatic ether ketone) thermoplastic block 3.58 g of 4,4'-oxybis(benzoyl chloride) is dissolved in 70 ml of 10-1 methanesulfonic acid solution. The mixture is stirred for 1 hour at 70° C. 17.5 g of PBO dope from Example 1(A) are added and the mixture is stirred for 17 hours at 90° C. 3.10 g of p-diphenoxybenzene is added and rinsed and down with 13.3 g of 10-1 methanesulfonic acid solution. The mixture is stirred for 48 hours at 50° C. The polymer is isolated as described in Example 2 and has an inherent viscosity of 2.16 dL/g.

EXAMPLE 27

Fiber Synthesis and Tests

Fibers are spun from dopes according to the following procedure and the conditions indicated in Table II hereinafter. Dope produced in the indicated Example is placed in a Teflon TM -lined extrusion vessel and degassed for about 18 hours at 0.4 in.Hg pressure and about 80° C. The extrusion vessel is fitted with a Teflon TM piston and driving mechanism and, at the bottom, a spinnerette with an aperature of 5 to 10 mil (1 mil=$10^{-3}$ in.). The entire assembly is seated over a water bath with a variable air gap (AG) between the spinnerette and the bath, as indicated in Table II hereinafter. The water temperature is maintained at 20° C. to 26° C. and the water depth at 7-8 in. The temperature of the extrusion vessel and spinnerette are controlled as shown in Table II.

Pressure (P) is applied as shown in Table II, forcing dope out through the spinnerette. The dope drops across the air gap (AG) into the bath and coagulates as a fiber, which is transferred to a nylon spool and stretched to a maximum by spin-drawing as shown in Table II. The stretched fiber is washed for at least 48 hours, air dried for 4 hours and vacuum dried at 100 for four hours.

Ten samples of each fiber are mounted, measured and tested according to ASTM-D3379-75 using a paper tab and epoxy mounting method. The diameter of each sample is measured three times using a Nikon-Optiphot TM microscope and calibrated lens, and an average diameter taken. The tensile strength and modulus are tested at 22° C. to 24° C. and 52% to 55% humidity using an Instron 4201 TM tensile tester. The resulting curve is analyzed and the tensile strength, tensile modulus and percent elongation to break are calculated as outlined in ASTM-D3379-75.

The results are reported in Table II below wherein:

Example is the Example previously set out in which the dope was synthesized;

AG is the air gap between the spinnerette and the water bath in inches;

Temp is the temperature of the Die and extrusion vessel in ° C.;

P is the extrusion pressure in psi;

SDR is the spin draw ratio, expressed as the length of the fiber after spin-drawing divided by the length of the fiber before spin-drawing;

Diam is the average diameter of the fiber in mil.;

T.M. is the tensile modulus of the fiber in msi (1 msi=1,000,000 psi);

T.S. is the tensile strength of the fiber in ksi (1 ksi=1,000 psi); and

Elong. is the percent elongation of the fiber before it breaks.

the temperature, under the atmosphere, and with the residence time shown in Table III, providing the additional spin-draw ratio shown in Table III. The properties of the heat-treated fibers are tested according to the previously set out procedure. The results are reported in Table III below wherein:

Sample identifies the Sample from Table II which is treated and tested;

T identifies the temperature of the oven in ° C.;

Atm identifies the atmosphere in the oven;

Res. T. identifies the residence time of the fiber in the oven in minutes;

SDR identifies the spin draw ratio of the heat treated fiber, expressed as the length of the heat-treated fiber divided by the length of the untreated fiber from Table II;

Diam. is the diameter of the heat treated fiber; and all other columns have the meaning previously assigned.

TABLE III
HEAT-TREATED FIBERS & PROPERTIES

| Sample | T | Atm | Res. t | SDR | Diam | T.M. | T.S. | Elong. |
|---|---|---|---|---|---|---|---|---|
| 2 | 400 | $N^2$ | 1.98 | 1.11 | 2.22 | 7.54 | 97.73 | 9† |
| 3 | 400 | $N^2$ | 1.98 | 1.21 | 3.73 | 6.95 | 95.93 | 7.2 |
| 5 | 300 | Air | 1.11 | 1.16 | 2.14 | 6.33 | 100.1 | 5.89 |
| 5 | 300 | Air | 0.5 | 1.10 | 2.35 | 6.00 | 92.41 | 7.3 |
| 7 | 400 | Air | 0.5 | 1.30 | 1.78 | 5.51 | 85.44 | 8.2 |
| 8 | 400 | Air | 0.5 | 1.22 | 1.69 | 4.85 | 78.27 | 9.9 |
| 12 | 400 | Air | 1.49 | 1.18 | 1.96 | 4.98 | 98.73 | 19† |
| 15 | 300 | Air | 1.50 | 1.00 | 1.95 | 4.23 | 75.38 | 11.9 |
| 18 | 400 | $N^2$ | 2.55 | 1.15 | 3.35 | 5.90 | 109.66 | † |
| 18 | 400 | $N^2$ | 2.55 | 1.28 | 3.24 | 6.50 | 114.79 | † |
| 18 | 400 | $N^2$ | 2.55 | 1.15 | 3.3 | 7.8 | 100.29 | 10.63 |
| 19 | 400 | $N^2$ | 3 | 1.14 | 2.96 | 24.7 | 174.3 | 2.6 |
| 20 | 400 | $N^2$ | 3 | 1.25 | 3.16 | 23.7 | 140.3 | 1.68 |
| 21 | 400 | $N^2$ | 3 | 1.25 | 3.19 | 19.6 | 149.5 | 4.5 |
| 22 | 400 | Air | 4.83 | 1.31 | 1.9 | 11.7 | 125.78 | 2.2 |
| 22 | 400 | Air | 4.62 | 1.37 | 1.88 | 11.95 | 124.60 | 2.56 |
| 22 | 400 | Air | 5.15 | 1.23 | 1.75 | 12.89 | 141.0 | 2.53 |
| 23 | 400 | Air | 4.01 | 1.14 | 3.44 | 13.97 | 130 | 4.43 |

† most samples did not break

TABLE II
SPUN FIBERS & PROPERTIES

| Sample | Example | A.G. | Temp | P | SDR | Diam | T.M. | T.S. | Elong. |
|---|---|---|---|---|---|---|---|---|---|
| 1 | 6 | 2⅝ | 70 | 30 | 2.40 | 2.26 | 4.08 | 64.95 | 13.15 |
| 2 | 6 | 2⅝ | 70 | 30 | 2.28 | 2.35 | 4.20 | 72.50 | 20 |
| 3 | 6 | 1 | 45 | 60 | 2.59 | 4.21 | 3.17 | 64.338 | † |
| 4 | 6 | 2⅝ | 50 | 55 | 0 | 3.48 | 3.18 | 91.22 | † |
| 5 | 7 | 4¼ | 70 | 40 | 2.17 | 2.40 | 3.50 | 70.30 | 20 |
| 6 | 7 | 4¼ | 70 | 40 | 2.34 | 2.34 | 4.51 | 70.80 | 11.5 |
| 7 | 7 | 7⅞ | 80 | 30 | 1.84 | 1.99 | 3.01 | 60.52 | 25+ |
| 8 | 7 | 7⅞ | 80 | 30 | 1.91 | 2.03 | 2.48 | 55.65 | 25+ |
| 9 | 12 | 3⅛ | 80 | 50 | 3.11 | 2.96 | 3.73 | 79.53 | 21 |
| 10 | 12 | 3⅛ | 80 | 50 | 2.89 | 2.99 | 3.06 | 77.43 | 16.81 |
| 11 | 12 | 3⅛ | 80 | 45 | 2.68 | 2.69 | 4.00 | 88.00 | 17.9 |
| 12 | 12 | 3⅛ | 90 | 47.5 | 1.66 | 1.98 | 3.73 | 77.44 | 11 |
| 13 | 12 | 2⅝ | 50 | 60 | 1.99 | 3.95 | 2.64 | 59.11 | 29+ |
| 14 | 12 | 3⅛ | 80 | 45 | 2.44 | 2.6 | 4.5 | 75.8 | 16.6 |
| 15 | 11 | 4¼ | 80 | 20 | 1.54 | 1.95 | 3.59 | 58.60 | 10.4 |
| 16 | 13 | 2⅝ | 80 | 15 | 1.96 | 1.8 | 3.29 | 55.53 | 16.4 |
| 17 | 13 | 2⅝ | 80 | 15 | 2.32 | 1.67 | 3.68 | 63.83 | 15.18 |
| 18 | 14 | 2⅝ | 50 | 60 | 1.99 | 3.76 | 3.53 | 66.97 | † |
| 19 | 15 | 2⅛ | 80 | 53 | 2.3 | * | * | * | * |
| 20 | 15 | 3 | 80 | 75 | 2.0 | * | * | * | * |
| 21 | 15 | 3 | 80 | 75 | 2.02 | * | * | * | * |
| 22 | 16 | 2⅛ | 80 | 22.5 | 1.51 | * | * | * | * |
| 23 | 19 | 2⅛ | 100 | 125 | 2.38 | 3.93 | 7.14 | 79.46 | 13.73 |
| 24 | 19 | 2⅛ | 100 | 125 | 2.04 | 4.15 | 3.84 | 58.76 | 18.57 |

* not tested
† most samples did not break

Certain fibers from Table II are heat-treated by drawing under tension through an 18-inch tubular oven at

EXAMPLE 28

Film Casting and Properties

A dope solution is placed in an extrusion vessel, degassed and fitted with a piston as described in Example 27. A 1½ in. die with an adjustable gap is connected to the extrusion vessel by a stainless steel line. The extrusion vessel, line and die are maintained at about 80° C. The die is seated above a 6 in. stainless steel drum roller which is partially submerged in a 3 ft. water trough with water at a temperature of about 24° C. Pressure is applied to the dope, forcing it out of the die onto the drum, which rotates to bring the extruded dope into contact with the water. The coagulated dope passes through three submerged idle rollers to a submerged take-up spool. The collected film is washed under water for at least 48 hrs. and cut into 4 ft. lengths which are wrapped onto glass tubes. The tubes are air dried for 24 hrs. and dipped in water to release. The tubes are then vacuum dried at 160° C. for 4 hrs. In addition, samples 33 and 34 (hereinafter in Table IV) are heat-treated for 5 minutes at 300° C. and 400° C. respectively. Samples 36, 37, 38, 39 and 41 are stretched linearly along their long axes, and have a stretch ratio of 1.49, 1.49, 1.90, 2.7 and 2.0 respectively, expressed as the length of the film after stretching divided by its length before stretching.

The dried film is cut into strips and its tensile properties are tested according to ASTM-D882-83 using the equipment and conditions described in Example 27. The results are reported in Table IV below, wherein Example sets out the Example in which the dope was prepared;

P sets out the pressure used to extrude the dope in psi;

Die gap sets out the width of the gap in the extrusion die in mil.; and all other columns have the meanings assigned in Example 27.

TABLE IV

| FILM EXTRUSION & PROPERTIES | | | | | | |
|---|---|---|---|---|---|---|
| Sample | Example | P | Die Gap | T.S. | T.M. | Elong. |
| 25 | 18 | 100 | 4 | 49 | 1.8 | 29.8 |
| 26 | 18 | 100 | 4 | 26.7 | 0.77 | 18.3 |
| 27 | 18 | 100 | 4 | 16.7 | 0.80 | 11.1 |
| 28 | 18 | 100 | 4 | 18.7 | 0.65 | 8.75 |
| 28 | 18 | 79–108 | 4 | 24.4 | 1.00 | 13 |
| 30 | 18 | 79–108 | 4 | 27.4 | 1.3 | 21 |
| 31 | 18 | 79–108 | 4 | 20.2 | 0.84 | 15.6 |
| 32 | 18 | 79–108 | 4 | 29.0 | 1.07 | 31 |
| 33 | 18 | 79–108 | 4 | 40.7 | 1.79 | 14.2 |
| 34 | 18 | 79–108 | 4 | 33.6 | 1.68 | 12.6 |
| 35 | 18 | 79–108 | 4 | 23.8 | 0.9 | 25 |
| 36 | 18 | 79–108 | 4 | 46.3 | 2.5 | 14.3 |
| 37 | 18 | 79–108 | 4 | 39.5 | 4.3 | 5 |
| 38 | 20 | 50 | 4 | 18.8 | 0.77 | 3.63 |
| 39 | 20 | 50 | 4 | 30.3 | 1.55 | 3.98 |
| 40 | 21 | 95 | 5 | 41.8 | 1.09 | 39 |
| 41 | 21 | 95 | 5 | 79.6 | 6.27 | 10.7 |

What is claimed is:

1. A process for forming a block copolymer comprising the step of contacting:
    (a) a first polymer containing a block of PBZ polymer selected from the group consisting of polybenzoxazoles (PBO), polybenzobisoxazoles (PBO), polybenzothiazoles (PBT), polybenzobisthiazoles (PBT), polybenzimidazoles (PBI) and polybenzobisimidazoles (PBI) and a first active end group, linked to the block of PBZ polymer, which contains either:
        (1) an azole-forming moiety chosen from the class consisting of electron-deficient carbon groups and o-amino-basic moieties, or
        (2) a decoupling group bonded to the block of PBZ polymer and an acylation reactive group, bonded to the decoupling group, chosen from the class consisting of acid groups and aromatic groups,
    in mineral acid capable of dissolving it, with either
        (1) a thermoplastic polymer containing a polyamide, polyimide, polyquinoxaline, polyquinoline, poly(aromatic ketone), poly(aromatic sulfone) or poly(aromatic ether) or a copolymer of one of those polymers, which thermoplastic polymer is soluble in the mineral acid and is terminated by a second active end group that can react to form a link with the first active end group or
        (2) at least one monomer which can react in the mineral acid to form a link with first active end group and to form a thermoplastic polymer containing poly(aromatic ketone), poly(aromatic sulfone) or poly(aromatic ether) or a copolymer of one of those polymers,
    under conditions such that a copolymer having a PBZ polymer block and thermoplastic polymer block is formed.

2. The process of claim 1 wherein the PBZ polymer is contacted with a thermoplastic polymer and wherein each polymer is terminated by an azole-forming moiety.

3. The process of claim 2 wherein the thermoplastic polymer is a polyquinoxaline terminated by an aromatic group containing an o-diamine moiety.

4. The process of claim 2 wherein the PBZ polymer is terminated by an o-amino-basic moiety.

5. The process of claim 4 wherein the thermoplastic polymer is a polyamide polymer or copolymer terminated by an electron-deficient carbon group.

6. The process of claim 4 wherein the thermoplastic polymer is a poly-amide-imide or poly-imide-poly(aromatic ether ketone or sulfone) copolymer terminated by an electron-deficient carbon group.

7. The process of claim 4 wherein the thermoplastic polymer is a polyquinoline polymer or copolymer terminated by an electron-deficient carbon group.

8. The process of claim 4 wherein the thermoplastic polymer is a polyquinoxaline polymer or copolymer terminated by an electron-deficient carbon group.

9. The process of claim 4 wherein the thermoplastic polymer is a poly(aromatic ketone) polymer or copolymer terminated by an electron-deficient group.

10. The process of claim 4 wherein the thermoplastic polymer is a poly(aromatic sulfone) polymer or copolymer terminated by an electron-deficient carbon group.

11. The process of claim 4 wherein the thermoplastic polymer is a poly(aromatic ether ketone or sulfone) polymer or copolymer terminated by an electron-deficient carbon group.

12. The process of claim 2 wherein the PBZ polymer is a polybenzoxazole polymer.

13. The process of claim 2 wherein the PBZ polymer is a polybenzothiazole copolymer.

14. The process of claim 2 wherein the PBZ polymer is a polybenzimidazole polymer.

15. The process of claim 1 wherein the first polymer contains:
    (a) a block of PBZ polymer;
    (b) a decoupling group bonded to one end of the block of PBZ polymer;

(c) a first acylation reactive group, chosen from the class consisting of acid groups and aromatic groups, bonded to the decoupling group;

and is reacted with a second polymer containing:

(1) a thermoplastic polymer which is stable in mineral acid under reaction conditions; and (2) a second acylation reactive group, which is capable of reacting with the first acylation reactive group, linked to the thermoplastic polymer.

16. The process of claim 15 wherein the first acylation reactive group is an acid group and the second acylation reactive group is an aromatic group.

17. The process of claim 15 wherein the first acylation reactive group is an aromatic group and the second acylation reactive group is an acid group.

18. The process of claim 15 wherein the thermoplastic polymer is a poly(aromatic ether ketone or sulfone) polymer or copolymer.

19. The process of claim 15 wherein the thermoplastic polymer is a poly-amide-imide or poly-amide/poly-(aromatic ether) copolymer.

20. The process of claim 15 wherein the thermoplastic polymer is a polyquinoline polymer or copolymer.

21. The process of claim 15 wherein the thermoplastic polymer is a polyquinoxaline polymer or copolymer.

22. The process of claim 15 wherein the thermoplastic polymer is a poly(aromatic ketone) polymer or copolymer.

23. The process of claim 15 wherein the thermoplastic polymer is a poly(aromatic sulfone) polymer or copolymer.

24. The process of claim 15 wherein the thermoplastic polymer is a polyamide polymer or copolymer.

25. The process of claim 24 wherein polyamide is bonded to a second decoupling group and the second decoupling group is bonded to the acylation reactive group.

26. The process of claim 25 wherein each decoupling group contains a plurality of aromatic groups.

27. The process of claim 26 wherein the first acylation reactive group is an acid group and the second acylation reactive group is an aromatic group.

28. The process of claim 15 wherein the PBZ polymer is a polybenzoxazole polymer.

29. The process of claim 15 wherein the PBZ polymer is a polybenzothiazole copolymer.

30. The process of claim 15 wherein the PBZ polymer is a polybenzimidazole polymer.

31. The process of claim 1 wherein the first polymer contains:

(a) a block of PBZ polymer;

(b) a decoupling group bonded to one end of the block of PBZ polymer;

(c) a first acylation reactive group, chosen from the class consisting of acid groups and aromatic groups, bonded to the decoupling group;

and is reacted with one or more monomers, each having two acylation groups, which can react in mineral acid to form a link with the acylation reactive group of the first polymer and to form a thermoplastic second polymer containing poly(aromatic ketone), poly(aromatic sulfone) or a poly(aromatic ether) or a copolymer of one of those polymers.

32. The process of claim 31 wherein the acylation reactive group of the first polymer is an aromatic group.

33. The process of claim 31 wherein the acylation reactive group of the first polymer is an acid group.

34. The process of claim 31 wherein the monomer or monomers are suitable to provide a poly(aromatic ether) polymer or copolymer thereof.

35. The process of claim 34 wherein the monomer or monomers are suitable to provide a thermoplastic PBZ/poly(aromatic ether) copolymer.

36. The process of claim 35 wherein the monomers used in the process contain at least one monomer chosen from the group consisting of 4,6-diaminoresorcinol, 2,5-diaminohydroquinone and salts thereof; at least one monomer chosen from the group consisting of bis-(4-benzoic acid) and oxy-bis-(4-benzoic acid) and acid halides thereof; and at least one monomer chosen from the group consisting of diphenoxybenzene and diphenoxybiphenyl.

37. The process of claim 36 wherein the 4,6-diaminoresorcinol or 2,5-diaminohydroquinone is first contacted with the bis-(4-benzoic acid) or oxy-bis-(4-benzoic acid) or acid halides thereof, and the reaction product of those monomers is contacted with the diphenoxybenzene or diphenoxybiphenyl.

* * * * *

UNITED STATES PATENT AND TRADEMARK OFFICE
CERTIFICATE OF CORRECTION

PATENT NO. : 5,089,568

DATED : February 18, 1992

INVENTOR(S) : William J. Harris and Wen-Fang Hwang, both of Midland, Michigan It is certified that error appears in the above-identified patent and that said Letters Patent is hereby corrected as shown below:

Column 50, line 50, delete " electron-deficient group. " and insert -- electron-deficient carbon group. --.

Column 52, line 14, delete " acylation groups, " and insert -- acylation reactive groups, --.

Signed and Sealed this

Twenty-eighth Day of September, 1993

Attest:

Attesting Officer

BRUCE LEHMAN

Commissioner of Patents and Trademarks